(12) United States Patent
Erickson et al.

(10) Patent No.: US 11,458,499 B2
(45) Date of Patent: Oct. 4, 2022

(54) ADJUSTABLE SYSTEM AND APPARATUS FOR PROMOTING PLANT GROWTH AND PRODUCTION

(71) Applicant: The Agricultural Gas Company, Inc., Petaluma, CA (US)

(72) Inventors: Stewart E. Erickson, Petaluma, CA (US); Christian Ahrens, Midvale, UT (US)

(73) Assignee: The Agricultural Gas Company, Inc., Petaluma, CA (US)

( * ) Notice: Subject to any disclaimer, the term of this patent is extended or adjusted under 35 U.S.C. 154(b) by 475 days.

(21) Appl. No.: 16/445,886

(22) Filed: Jun. 19, 2019

(65) Prior Publication Data

US 2019/0364741 A1    Dec. 5, 2019

Related U.S. Application Data

(63) Continuation-in-part of application No. 15/934,693, filed on Mar. 23, 2018, now Pat. No. 11,071,257.

(51) Int. Cl.
*A01G 7/02* (2006.01)
*A01G 9/18* (2006.01)
(Continued)

(52) U.S. Cl.
CPC .............. *B05B 15/628* (2018.02); *A01G 7/02* (2013.01); *A01G 9/18* (2013.01); *A01G 9/243* (2013.01);
(Continued)

(58) Field of Classification Search
CPC ......... B05B 15/628; B05B 15/68; A01G 7/02; A01G 7/00; A01G 9/18; A01G 9/243; A01G 9/247; A01M 7/0003; F16M 11/04; F16M 11/24; F16M 13/00; F16M 2200/028; F16M 2200/08
See application file for complete search history.

(56) References Cited

U.S. PATENT DOCUMENTS

| | | | | |
|---|---|---|---|---|
| 5,186,429 A | * | 2/1993 | Linnepe | F16B 7/14 403/109.5 |
| 6,186,715 B1 | * | 2/2001 | Oliviero | B60P 7/15 410/151 |

(Continued)

*Primary Examiner* — Tan Le
(74) *Attorney, Agent, or Firm* — Skinner and Associates; Joel Skinner

(57) ABSTRACT

A system and adjustable apparatus for applying $CO_2$ gas to improve *Cannabis* production. The system includes upstream and downstream stages or subsystems. The upstream subsystem receives and stores gas, particularly CO2 gas. It monitors the environment of the downstream subsystem, determines when and how to apply gas to plants growing in the downstream system, acquires gas stored in the upstream subsystem, and distributes it to the downstream system. It also has various monitoring, command and control, management, and reporting features. The downstream subsystem includes one or more plant growth areas or plots, gas distribution means, such as gas conduits, tubes or lines from the midstream subsystem, and the high efficiency, adjustable gas applicator, and various sensing and monitoring devices communicatively connected to the upstream subsystem. Also disclosed are systems, apparatus and methods for pest control, humidity control, and odor control.

12 Claims, 19 Drawing Sheets

(51) Int. Cl.

| | |
|---|---|
| *A01G 9/24* | (2006.01) |
| *A01M 7/00* | (2006.01) |
| *F16M 11/24* | (2006.01) |
| *F16M 11/04* | (2006.01) |
| *F16M 13/00* | (2006.01) |
| *B05B 15/628* | (2018.01) |
| *B05B 15/68* | (2018.01) |

(52) U.S. Cl.
CPC ........... *A01G 9/247* (2013.01); *A01M 7/0003* (2013.01); *B05B 15/68* (2018.02); *F16M 11/04* (2013.01); *F16M 11/24* (2013.01); *F16M 13/00* (2013.01); *F16M 2200/028* (2013.01)

(56) References Cited

U.S. PATENT DOCUMENTS

| | | | |
|---|---|---|---|
| 8,480,061 B2* | 7/2013 | Graves | E04H 17/20 |
| | | | 248/220.21 |
| 9,481,286 B1* | 11/2016 | Xiao | B60P 7/15 |
| 10,410,553 B2* | 9/2019 | Holyfield | G09F 17/00 |
| 11,071,257 B2* | 7/2021 | Erickson | A01G 9/246 |
| 2002/0062594 A1 | 5/2002 | Erickson | |
| 2002/0188459 A1 | 12/2002 | Erickson | |
| 2005/0205729 A1* | 9/2005 | Wang | F16M 13/027 |
| | | | 248/161 |

* cited by examiner

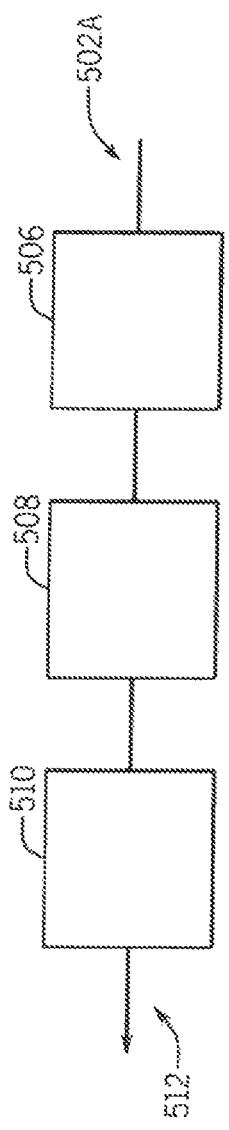
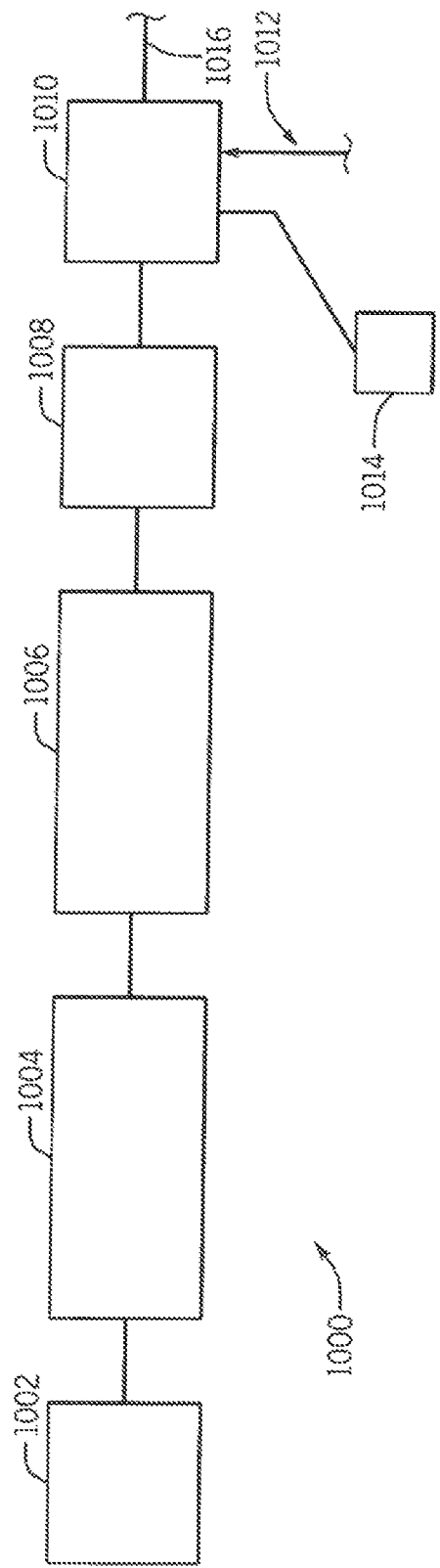

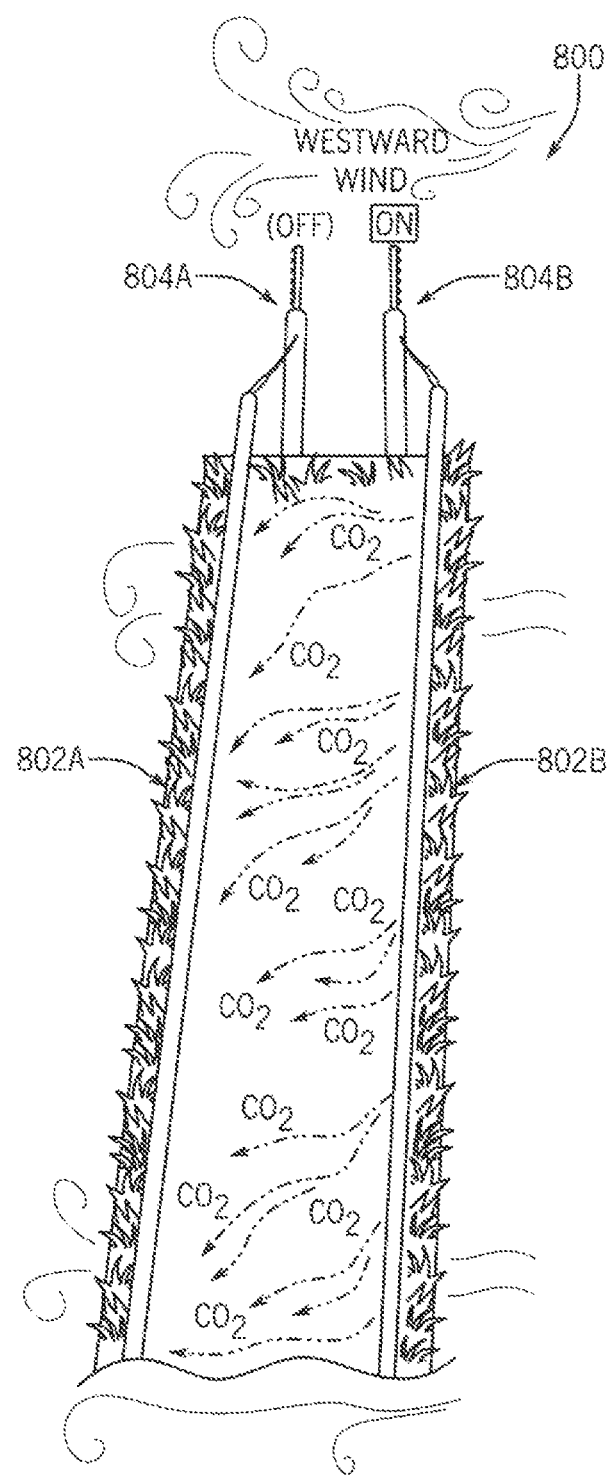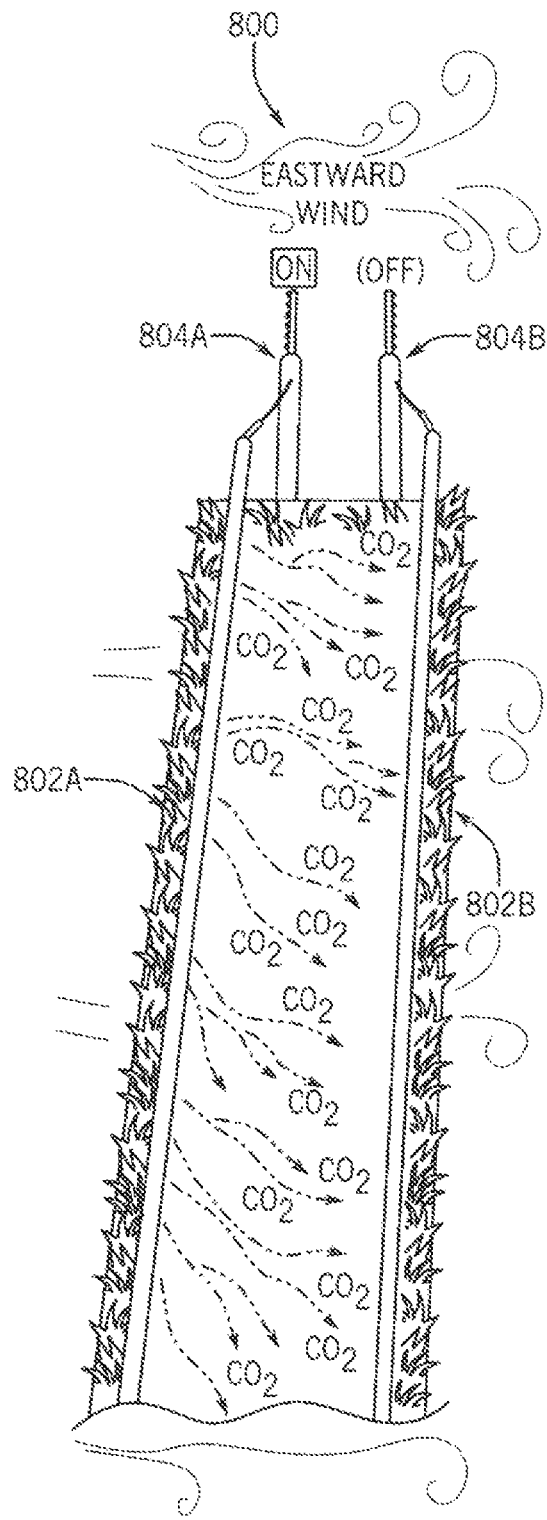
FIG. 15A
FIG. 15B

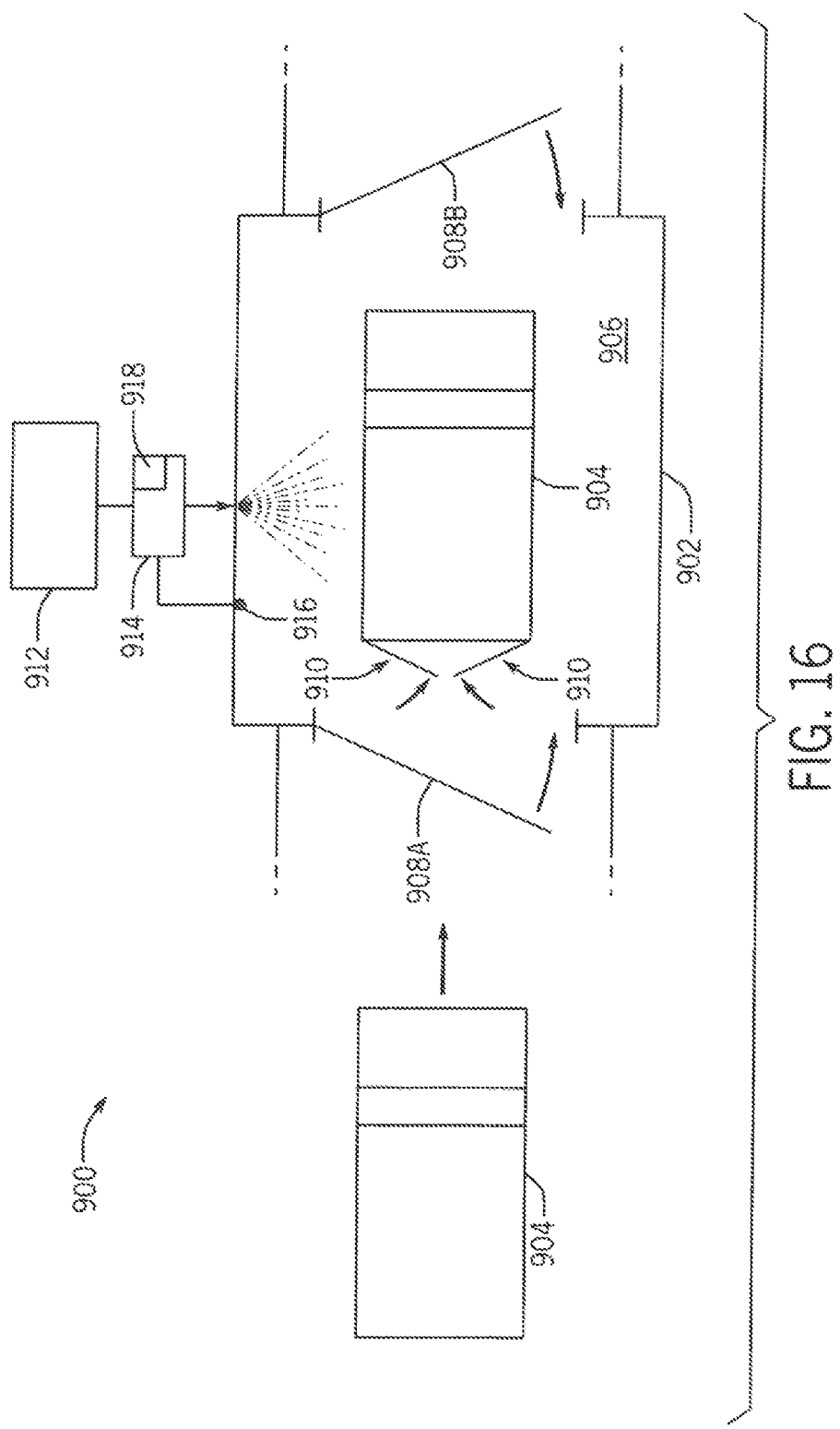

ADJUSTABLE SYSTEM AND APPARATUS FOR PROMOTING PLANT GROWTH AND PRODUCTION

CROSS-REFERENCE TO RELATED APPLICATIONS, IF ANY

This a Continuing In Part (CIP) application of U.S. patent application Ser. No. 15/934,693, filed Mar. 23, 2018, status pending, which claims the benefit under 35 U.S.C. § 119(e) of U.S. Provisional Patent Application Ser. No. 62/475,259, filed Mar. 23, 2017, which are hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to agricultural systems, apparatus and methods. Particularly, the invention relates to a system of delivering gases to crops. More particularly, the invention relates to an integrated, self-supporting $CO_2$ gas delivery system, subsystems, and apparatus therefor. Most particularly, the systems, subsystems and apparatus are useable to promote plant growth and production in *Cannabis*.

2. Background Information

Hoop house are generally about 60' long, with some being much longer or greenhouses being much longer providing the overall bed length for planting of crops such as *Cannabis*. Long beds of *Cannabis* and other crops of this configuration are also planted outdoors.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides an agricultural system, apparatus, and method which are beneficial, practical, reliable, and efficient, and which are believed to fulfill the need and to constitute an improvement over the background technology.

In one aspect, the invention provides a system for applying $CO_2$ gas to improve *Cannabis* production. The system includes upstream and downstream stages or subsystems. The upstream subsystem receives and stores gas, particularly CO2 gas. It monitors the environment of the downstream subsystem, determines when and how to apply gas to plants growing in the downstream system, acquires gas stored in the upstream subsystem, and distributes it to the downstream system. It also has various monitoring command and control, management, and reporting features. The downstream subsystem includes one or more plant growth areas or plots, gas distribution means, such as gas conduits, tubes or lines from the midstream subsystem, and the high efficiency, adjustable gas applicator, and various sensing and monitoring devices communicatively connected to the midstream subsystem.

In another aspect, the invention provides a height adjustment apparatus for a fluid sprayer, comprising a post adapted to be disposed vertically relative to a ground surface, a sleeve disposed around the post and slidable along the post, and a positioner connected to the sleeve which selectively engages and disengages the post to hold the sleeve in a fixed position along the post or to permit sliding of the sleeve along the post, respectively, and means to connect a sprayer to the sleeve.

In a further aspect, the invention provides a height adjustment apparatus for an elongated agricultural gas emission line, comprising a. a post adapted to be disposed vertically relative to a ground surface, wherein the post is a studded T-type post having generally T shaped cross-section with uniformly spaced studs on one longitudinal face thereof, spaces between studs forming notches;
b. a sleeve disposed around the post and slidable along the post, wherein the sleeve has a predetermined length and a predetermined inside diameter which is greater than an outside crossectional dimension of the post;
c. a positioner connected to the sleeve which selectively engages and disengages the post to hold the sleeve in a fixed position along the post or to permit sliding of the sleeve along the post, respectively, and wherein the positioner comprises a generally U shaped bracket and a spring clamp attached to the bracket such that the spring clamp is movable between a post engagement mode and a post disengagement mode,
  i. the bracket having first, second and third rectilinear faces, and a space disposed between the first and third faces, a predetermined part of the sleeve being disposed within the space,
  ii. the spring claim having first, second, third, and fourth rectilinear segments, the first segment extending from a mounting on the bracket first face across the bracket space and through the bracket third space, the second segment extending outside the bracket, generally along the third bracket face, the third segment extending outside the bracket generally between the third bracket face and the first bracket face, and the fourth segment extending outside the bracket, generally along the first bracket face to a mounting on the bracket first face; and
d. means to connect the gas emitter line to the sleeve, the means to connect a sprayer to the sleeve being selected from the group consisting of a screw, a bolt, an eyelet, adhesive, and a weld.

In a still further aspect, the invention provides an apparatus for selectively supplying gases to plants, comprising:

a media bed having a first elongated row of plants and a second elongated row of plants, the second row of plants being disposed along side the first row of plants, parallel therefrom and a predetermined distance therefrom;

a first gas line disposed above and being coextensive with the first row of plants;

a second gas line disposed above and being coextensive with the second row of plants;

an control valve connected to the first and the second gas lines;

a gas supply connected to the control valve;

means to detect wind speed disposed proximate the media bed;

means to detect wind direction disposed proximate the media bed;

a controller connected to the control valve, to the means to detect wind speed and to the means to detect wind direction, whereby the controller allocates gas to the first and second lines via the control valve, based on wind speed and direction proximate the bed.

And in yet another aspect, the invention provides a system for removing pests from plants during transport, comprising:

an housing enclosing an interior space adapted to receive transported plants, the housing having ingress means and egress means;

a supply of gas, the gas being toxic to pests on plants at a predetermined gas concentration for a predetermined exposure time period;

means to inject gas into the interior space of the housing from the supply of gas; and means to control concentration and time of exposure of gas injected into the interior space of the housing.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIGS. 11A-B show a further embodiment of the gas emitter lines and supports of the invention.

FIGS. 15 A and B illustrate an embodiment of a gas control system of the invention that adjusts gas application relative to wind direction and magnitude.

FIG. 16 is a plan view of an embodiment of a fixed base pest control system of the invention.

FIG. 19 is a diagram of an embodiment of a humidity control system for hoop houses of the present invention.

DETAILED DESCRIPTION

Figure 1:
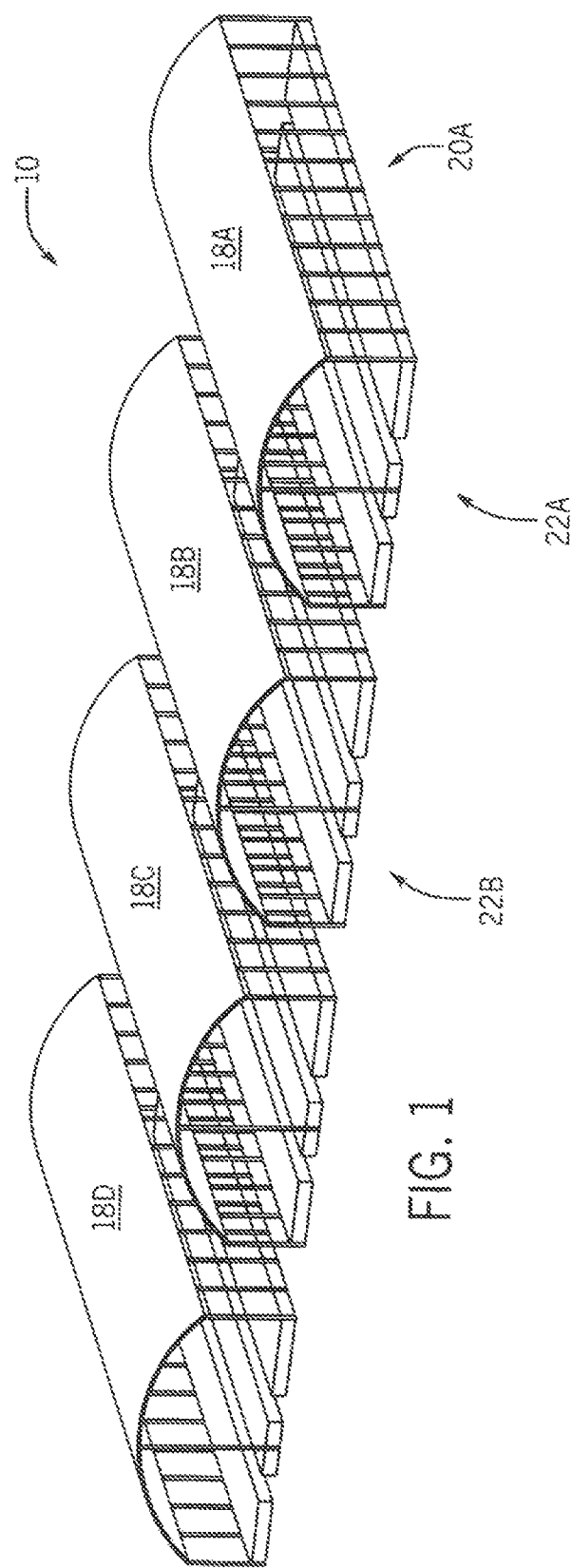
FIG. 1 is a perspective view of an embodiment of the system of the invention, including a hoop farm with one or more hoop houses laid out in one or more rows.

The present invention provides a system, apparatus, and methods for enhancing the growth of plants, particularly *Cannabis*, and most particularly *Cannabis* grown in green houses, hoop houses and the like. The invention utilizes Carbon Dioxide gas (CO2 or $CO_2$). The invention administers the gas in close proximity to plants growing in groups or plots so that the plants receive a maximum beneficial amount of the gas, for the longest reasonably possible time period. This also reduces cost to the grower. The system is able to maintain that close proximity distribution by various means including height adjustment means that permit the grower to easily adjust gas application height throughout the plant growth life cycle from seedlings or clones, juveniles, to mature plants ready for harvest. Further, the system permits fast and easy retraction at harvest time so that the gas distribution and application devices do not interfere with harvest tasks, whether manually or mechanized. The system is optimized to provide full monitoring and control of gas application, coordinated with light exposure, temperature regulation, watering, fertilizing and the like. The system may be integrated with lighting, heating, watering and feeding systems. Alternatively, it may be readily retrofitted to existing systems and devices.

Referring to FIGS. 1-5, an embodiment of a system 10 of the invention is preferably a multi-stage system which basically comprises upstream and downstream stages or subsystems. The upstream subsystem 12 shown in FIG. 5 receives and stores gas, particularly CO2 gas. It also monitors the environment of the downstream subsystem, determines when and how to apply gas to plants growing in the downstream system, acquires gas stored in the upstream subsystem, and distributes it to the downstream system. It also has various monitoring, command and control, management, and reporting features. The downstream subsystem shown in FIGS. 1-4 comprises one or more plant growth areas or plots, gas distribution means, such as gas conduits, tubes or lines from the midstream subsystem, and the high efficiency, adjustable gas application means, and various sensing and monitoring means communicatively connected to the midstream subsystem.

In the system, the plant growth plot or plots are preferably relatively compact, sheltered environments such as hoop houses or greenhouses. Most particularly, the green houses are hoop-type houses that are easy to construct from basic materials such as dimensional lumber, PVC plastic conduit, lightweight but rigid metal tubing and the like for base structures. They typically have roofs or tops, most often constructed of transparent or semitransparent, thin, flexible plastic material. The plastic sheet or sheets are placed over and supported by hoop supports (typically curved to shed rain, wind, snow and the like) placed at predetermined distances apart, which are supported by the base structure. The sheets are typically stretched tight over the roof hoop supports to aid in shedding the elements, but also to reduce noise from flapping in the wind, and to improve structural integrity. Houses typically have side and end walls. Such walls may be adjusted or removed depending up temperature, climate and other factors. The walls are also typically constructed of flexible materials, most typically transparent or semitransparent materials. Hoop houses commonly are constructed on grade and have rectangular floor plans. Plants may be grown on grade, with existing soil (enhanced or not). The system may also be applied to houses constructed on slabs of concrete, asphalt or other non-soil substrates. Lastly the system may be deployed in existing interior structures such as permanent greenhouses, warehouses, and other structures. A preferred embodiment utilizes plant boxes constructed of dimensional lumber such as 2×12s, and filled with a plant growth media composed of soil, and other materials beneficial to plant growth. Hoop houses may be provided with irrigation systems, light systems, heating systems, power, and the like. Although the invention is described in the context of a hoop houses, it is within the purview of the invention that the systems, apparatus and methods may be applicable to greenhouses or outside in fields, orchards, vineyards and the like.

Figure 2:
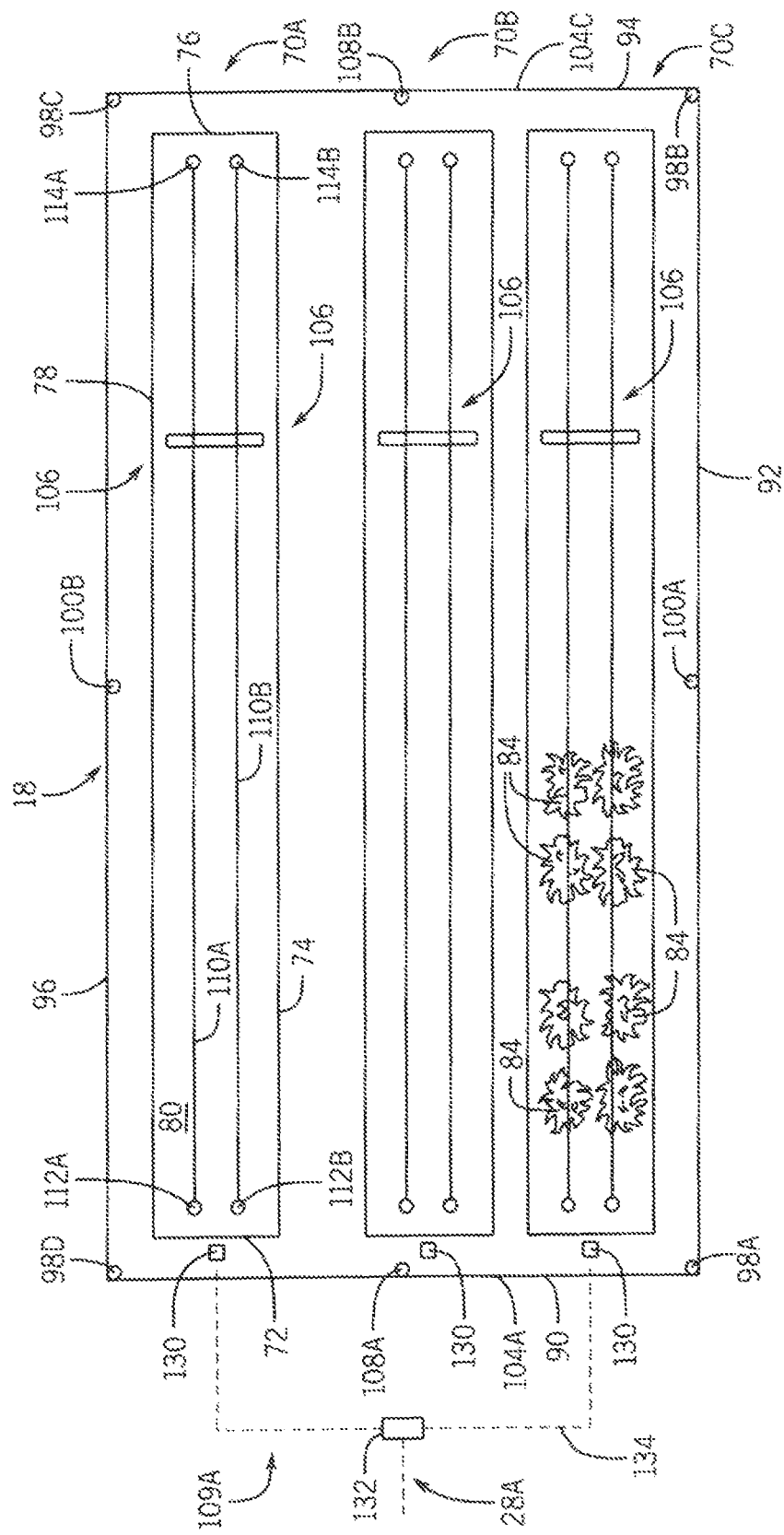
FIG. 2 is a plan view of an embodiment of a gas distribution system deployed in a hoop house.
Figure 3:
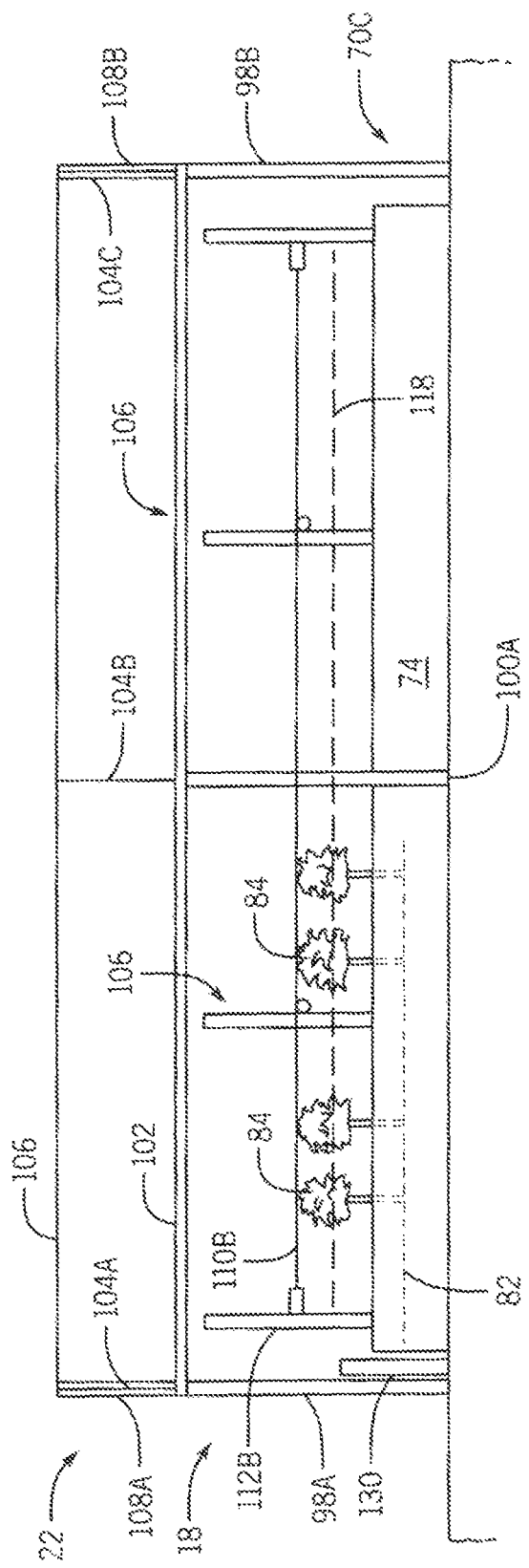
FIG. 3 is a side elevation view of the system components and features of FIG. 2.
Figure 4:
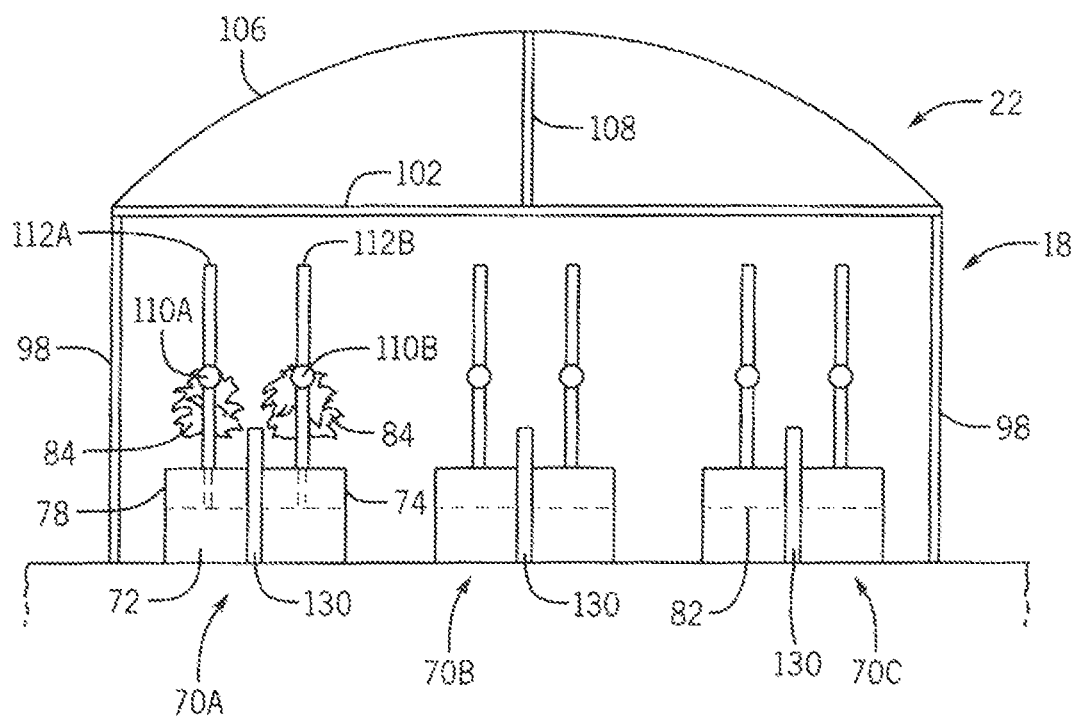
FIG. 4 is an end view of the system components and features of FIGS. 2 and 3.

Referring to FIG. 1, the downstream subsection of the system 10 of the invention consists of multiple hoop houses 18 constituting a farm, with plural houses arranged in rows 20 A-C and columns 22 A-C, respectively, both shown started by their first members. Paths exist between rows 20 and columns 22 of houses 18 for convenient movement of staff, equipment, material and harvested crops. Referring also to FIGS. 2-4, the hoop houses 18 have an elongated, rectangular configuration with first or proximal, and second or distal end walls 90 and 94, respectively, and side walls 92 and 96. Walls 90-96 are supported by corner posts 98A-D and a plurality of mid posts 100, the number of which depend upon the length of the house 18. The vertical walls 90-96 have a peripheral top plate 102. Curved, roof hoops 104 extend from one side of the plate 102 to the other. Roof material 106 is supported by the hoops 104. The roof 14 may be supported at its ends by one or more end supports 108.

The exemplary houses 12 for growing *Cannabis* have a length of approximately sixty (60) feet, a width of approximately fifteen (15) ft., and a height of approximately five (5) ft. measured at the base wall and approximately nine (9) ft. at the apex of the hoop. In the preferred embodiment, the downstream stage or farm of hoop houses 12 is disposed within a fence or other security structure. Ingress and egress occurs though one or more gates.

The upstream subsystem 12 is communicatively connected to the downstream subsystem via gas, electrical and data line conduits 24 and radio frequency (RF) and Wi-Fi wireless transmission. Gas is supplied to individual plots 18A-C via plot lines 28A-C. Gas may extend to plots disposed in columns behind a first row 20A of plots 18A-D via longitudinal feed lines, and then to further lateral trunks. Although the layout of plots 18 in the downstream subsection have been shown rectilinearly, they may be disposed in various other linear or non-linear arrangements. Gas lines are preferably buried, but they may be disposed above grade.

Figure 5:
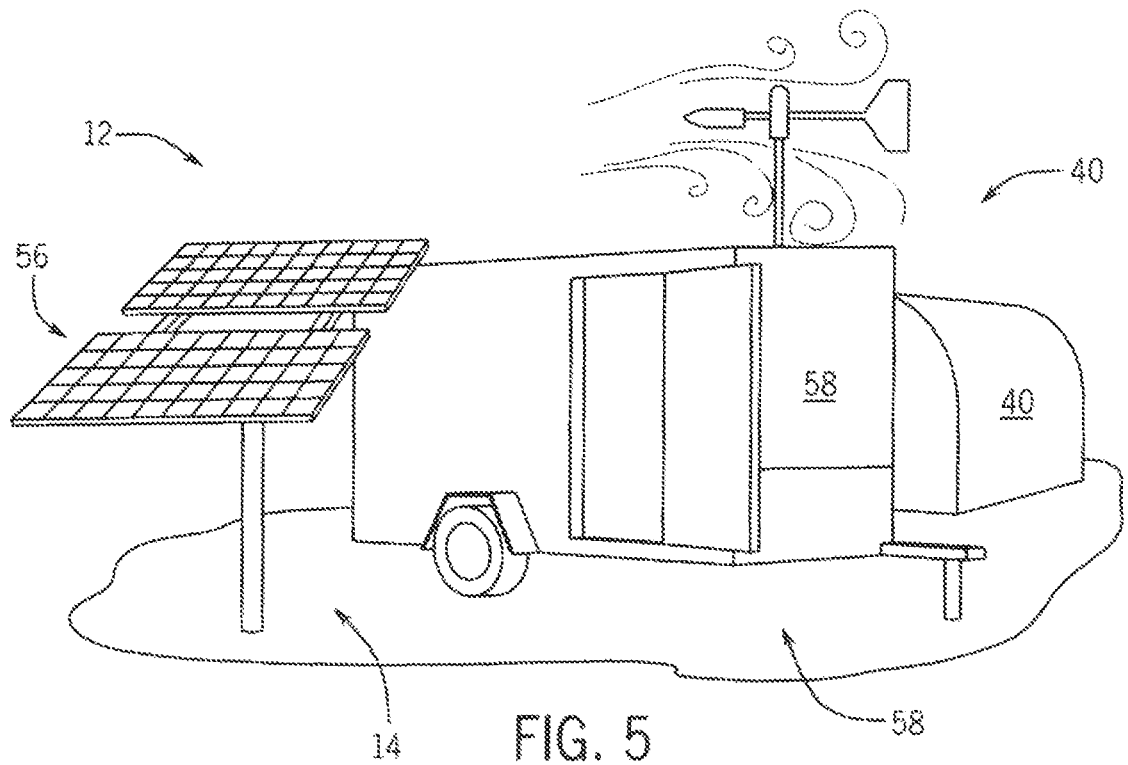
FIG. 5 illustrates an embodiment of the upstream components and features of the system, including a gas storage tank being filled by a gas transportation truck, a trailer containing various gas and electronic control features, and a solar power array.

A preferred embodiment of the upstream subsection 12 is shown in FIG. 5. The subsection 12 preferably comprises a tank 40, a valve assembly, an electronic control assembly, and a power supply. The tank 40 holds liquid Carbon Dioxide ($CO_2$). It has a bulk storage capacity of between 5 and 50 Tons of liquefied $CO_2$. It is within the purview of the invention that $CO_2$ may be supplied in smaller quantiles such as 1,000-pound Dewars. And the system may be deployed in close proximity to a $CO_2$ manufacturing facility (i.e. an ethanol, ammonia or power generating plant) and $CO_2$ be directly derived therefrom. An exemplary tank is manufactured by Chart Industries of Prior Lake, Minn., USA.

The tank 40 has a fill inlet 62. The tank is preferably also connected to a pressure builder which maintains the $CO_2$ in a liquid form in the tank 40. An exemplary pressure builder is manufactured by Air Products of Allentown, Pa., USA. The vaporizer is also connected to the tank 40. It functions to convert $CO_2$ from the tank 40 in a liquid state into a $CO_2$ in a gas state for use in the system. $CO_2$ gas exits an outlet at a pressure of between 200 and 400 psi., preferably 300 psi. An example vaporizer is available from Thermax of Dartmouth, Mass., USA. The upstream subassembly 12 is preferably secured by its own security fence.

The upstream subsystem also comprises the valve assembly, electronic control assembly, RF and Wi-Fi transmission and power supply. These components are preferably located in a secure housing. In the preferred embodiment, they are shown disposed in a trailer 58. The valve assembly controls distribution of $CO_2$ gas to the downstream system. The electronic control assembly is communicatively connected to the valve assembly and provides instructions to it, as to how to most efficiently distribute gas. The electronic control assembly is powered by power supply. The power supply preferably contains batteries and AC power connections. The upstream section also preferably has a solar array 56 for recharging the batteries of the power supply. The electronic control assembly preferably has both direct wire connections and wireless (WIFI, RF or the like) connections to various sensors (temperature, humidity, $CO_2$ concentration, light intensity, wind speed, wind direction, and infrared leaf temperature readings that help determine VPD-vapor pressure deficit) disposed in the downstream section. The electronic control assembly also preferably has means to connect remotely via hardwire telephone, CDMA cell and/or satellite transmission.

Figure 9A:
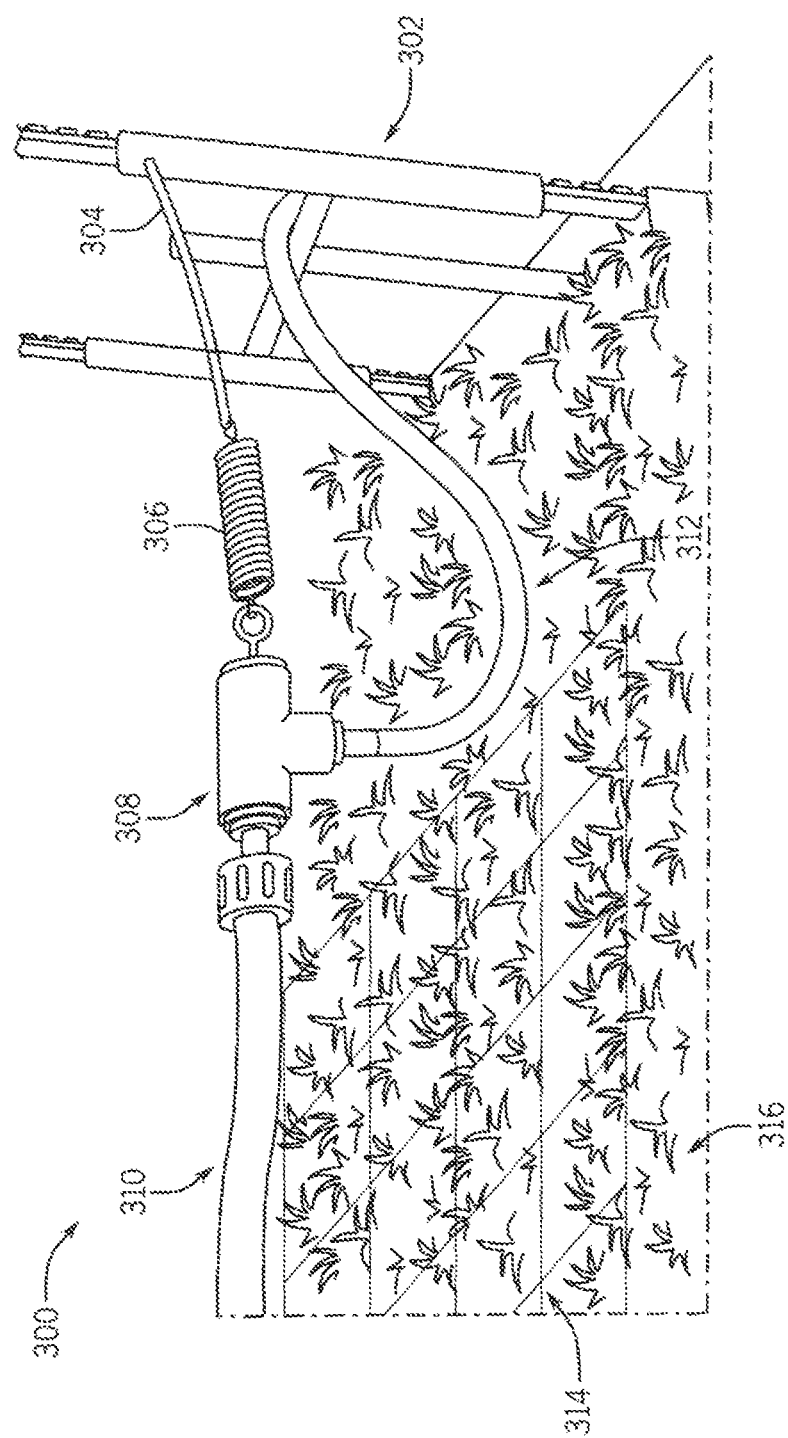
FIGS. 9 A and B show an embodiment of a emitter line suspension sub-system of the invention.
Figure 9B:
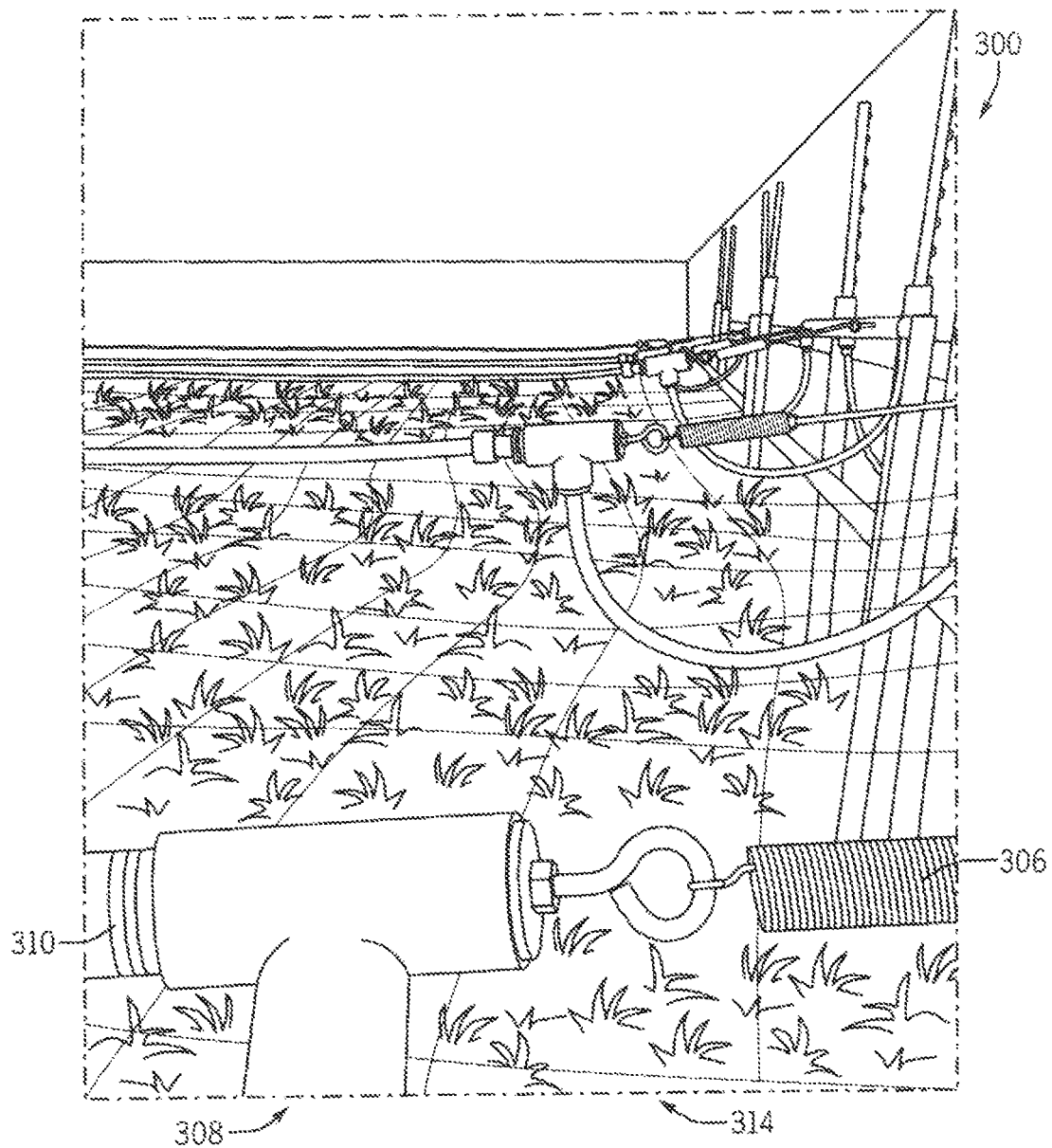

Returning to FIGS. 2-4, the individual hoop houses 18 of the downstream section 16 include plural, for example three (3) beds 70A-C. The beds 70, preferably have an elongated, rectangular configuration, with proximal and distal end walls 72 and 78 and side walls 74 and 76 surrounding a central planting area 80. The planting area 80 may utilize existing soils, on grade or built up, or preferably contains a particular planting media 82. The beds 70 have a thickness or depth of between 6 and 18 inches, preferably about 10 in. when 2×12 dimensional lumber is used for the walls 72-78. Media 82 substantially fills the planting area 80 to a depth of approximately 9 in. As is best shown in FIGS. 9 and 16, once the beds 70 are planted with seeds, seedlings, clones or other small plants 84, mulch (such as straw) may be applied to the beds 70, covering the planting area 80 between the individual plants 84. A stabilizing mesh trellis blanket 118 may then be applied, covering the planting area 80. Typically, multiple layers (for example four or more) of mesh are applied sequentially as the plants mature. Although the beds have been described as being constructed on the floor of a hoop house or the like, it is within the purview of the invention that the beds could be laid out on elevated tables or other elevated structures containing natural or artificial soils, or hydroponic liquid media, or trays, pots, soil containing bags or the like.

In the preferred embodiment shown, paths exist between beds for movement of staff, equipment, material and harvested crops. However, the intra bed paths are small and tight so that maximum space inside the house is devoted to plant growth. Because of this, applicants' invention has a means of maintaining clear paths or rendering them clear during maintenance or harvest. The exemplary bed for growing *Cannabis* has a length of approximately 58 feet, a width of 3 ft., and a bed height of about 1 ft. This yields a planting area 80 of approximately 180 square feet. The intra-bed paths are approximately 18 in. wide. Ingress and egress occurs though one or both ends of the hoop house.

Figure 10A:
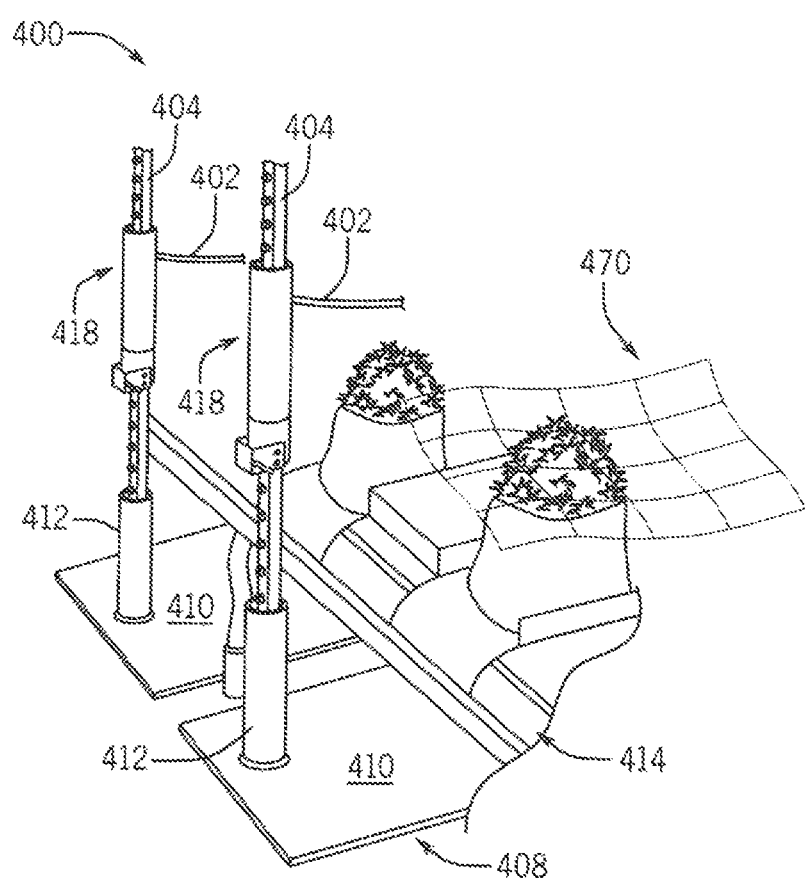
FIGS. 10 A and B show an embodiment of an offset weighted leg assembly for use on concrete floors.
Figure 10B:
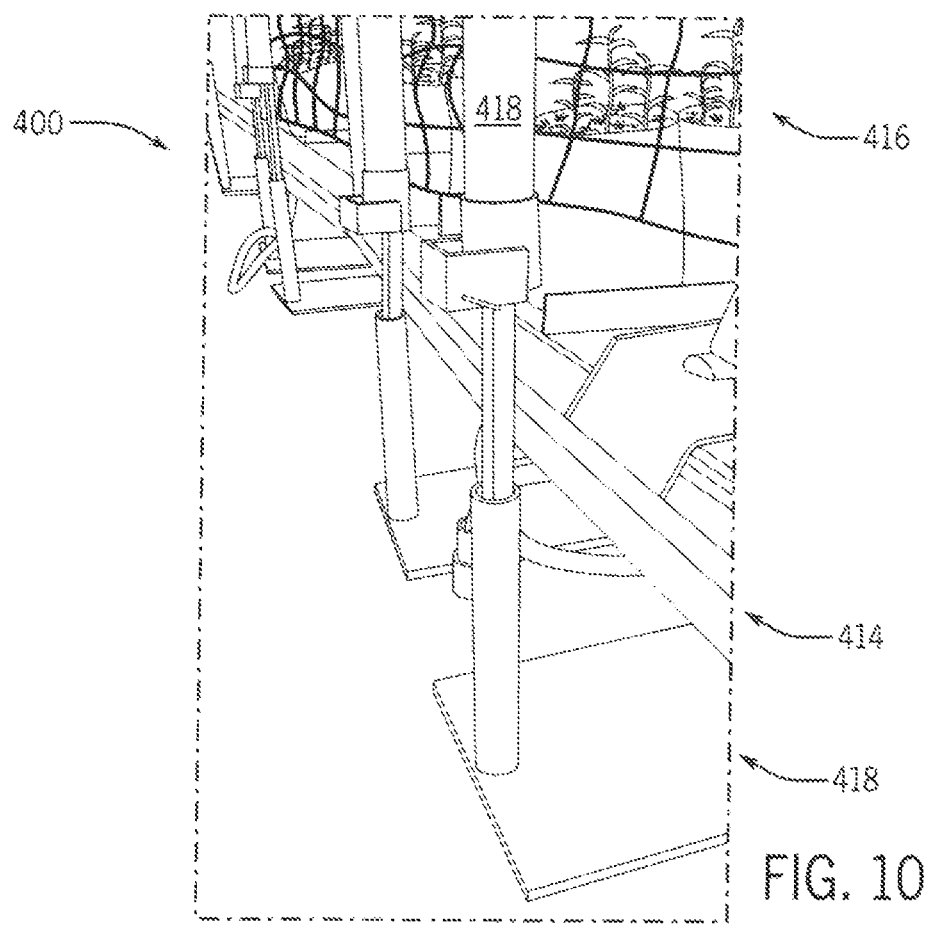

Each bed 70 includes a gas emission assembly 109. Referring also to FIGS. 2 and 3, one embodiment of the gas emission assembly 109 includes a bed distribution manifold 130 and at least one gas emission line, tube or conduit 110. In the preferred embodiment, a pair of lines 110A-B is utilized. The gas distribution manifold 130 is disposed at the first or proximal end of the bed 70, nearest the up and midstream subsystems 12 and 14, and receives gas therefrom. For house 18 having plural bed 70, the manifold 130 for each bed may receive gas from a hoop house distribution splitter or manifold 132 (connected to the main gas line 28A) via supply lines 134. Lines 134 are preferably buried under the soil. Emission lines 110 are elongated and extend essentially the entire length of each bed 70. Lines 110 A and B are disposed a predetermined distance apart, preferably 12 in., the lines also being equally spaced from the sides of the bed 70. The lines 110 are tubes having a central gas lumen and a plurality of emission apertures which emit $CO_2$ gas to the plants 84. The lines 110 are preferably constructed of a flexible plastic material and have an outside diameter of $5/8$ in. The apertures are preferably circular and have a diameter of between $1/4$ to $3/4$ in. The lines 110 are supported at each end by end posts 112 and 114. The line 110 ends are connected to the posts 112 and 114 via at least one tension adjustment assembly 148 at each line 110 end. The tensioners 148 are preferably spring bias type tensioners and zip ties. Tensioners 148 may be disposed at only one, or both ends of each line 110. The zip tie tensioners properly adjust the length and tension and the springs maintain the proper tension in the lines. In the embodiment of FIG. 10, the lines 110 are indirectly connected to the posts 112 and 114 via lateral members 142. Direction connection may be made in the alternative. The lateral members 142 also can function to distribute and circulate gas. The proximal member 142 is shown to be communicatively connected to the manifold 130 via gas line 140. Proximal member 142 is then connected to each line 110A-B via flexible lines 144 and coupler assemblies 146. In view of the length and flexibility of the emission lines 110, at least one lateral mid-support assembly 106 is disposed along the length of the lines 110, typically at the mid or half way point of the length of the lines 110 generally at 20' to 30' intervals or such spacing necessary to prevent significant drooping in the lines and to prevent the lines from undesirable flapping in the wind. The lateral support preferably extends below and supports both lines 110A-B for ease of adjustment. A $CO_2$ gas line pressure sensor 156 is preferably connected in line with the assembly 130, preferably at the downstream end. This embodiment of the assembly 130 utilizes a continuous loop lumen from end to end. Alternatively, the gas lines 110 A/B may terminate at the distal end whereby all gas is emitted from the line apertures and does not circulate.

Significantly, the gas emission assemblies 109 are height adjustable so that the lines may be disposed and maintained within intimate proximity to the upper leafy canopy of the plants where sunlight is directly incident to said leaves and adjustable to the upper canopy of the plants 84 as they grow. As the plants grow the lines can be slightly nested within the canopy, but should never be disposed more than a few inches above the canopy due to loss of efficacy of the CO2 due to wind losses and diffusional forces losses known technically in physics and chemistry as Brownian Motion. The lines 110 will be oriented just at the tops of the plants.

Figures 6A, 6B:
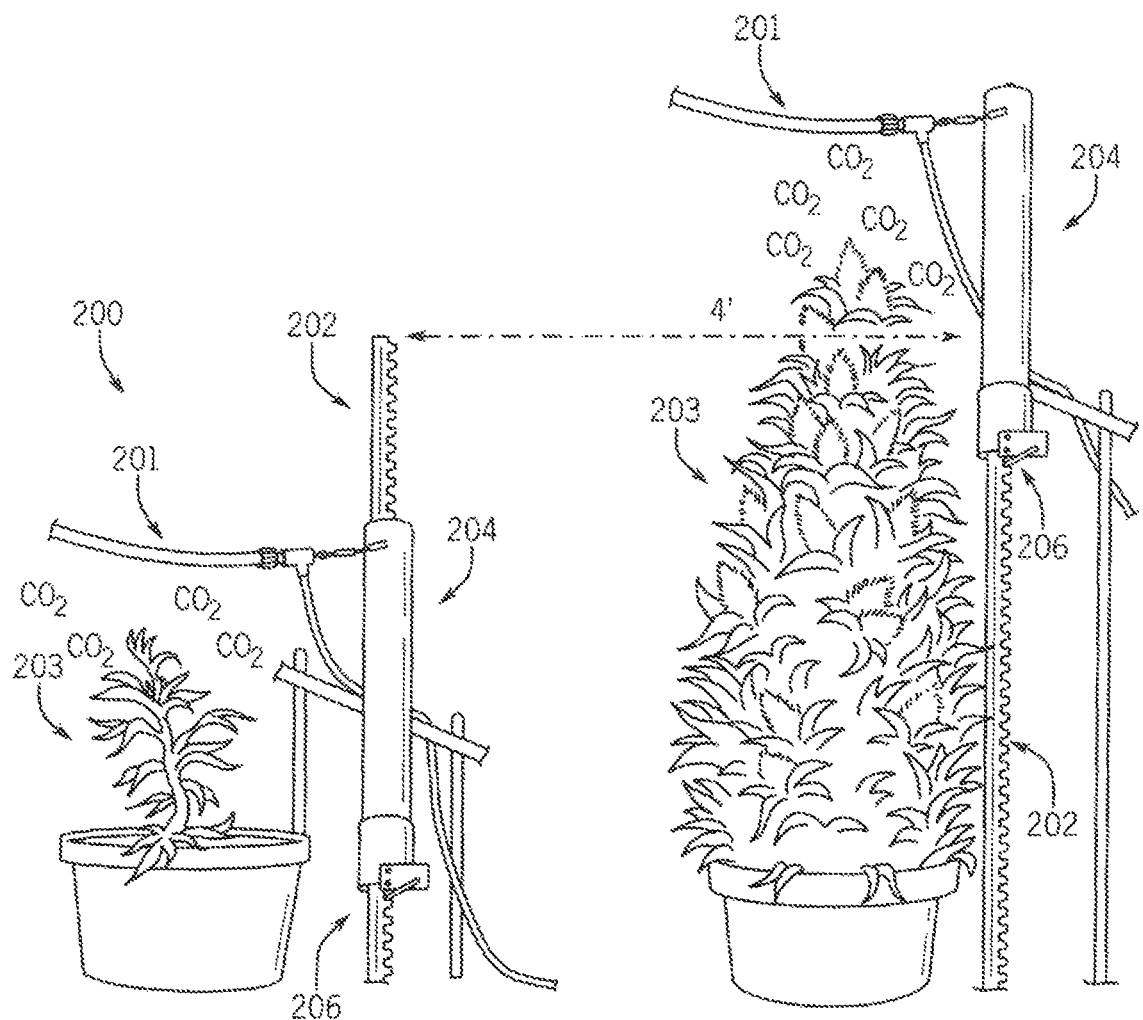
FIGS. 6 A and B illustrate an embodiment of gas emitter line height adjustment sub-system of the invention, which is useable with the system of the invention.

In the embodiment of FIG. 6, the height adjustment means 200 comprises a vertical member 202, a sleeve 204 adapted to be disposed around the vertical member 202, and a ratchet or positioner assembly 206 coupled to the sleeve 204 and which selectively engages the vertical member 202. The vertical member 202 is a studded T-Type post. The sleeve 204 serves as a direct or indirect anchor or connection point for an emitter assembly 201. The height adjuster 200 permits adjustment of the position of the emitter 201 as one or more plants 203 grow from a juvenile state (FIG. 6A) to maturity (FIG. 6B). The height adjuster 200 also permits complete removal of the emitter 201 during planting, installation of mesh trellis blankets and harvesting, by moving the sleeve 204 fully upward and over the top end of the vertical member 202, whereby the sleeve 204 and attached emitter 201 are separated from the vertical member 202 and the emitter 201 may be moved freely away from the plant(s) 203 or earth.

Figure 8A:
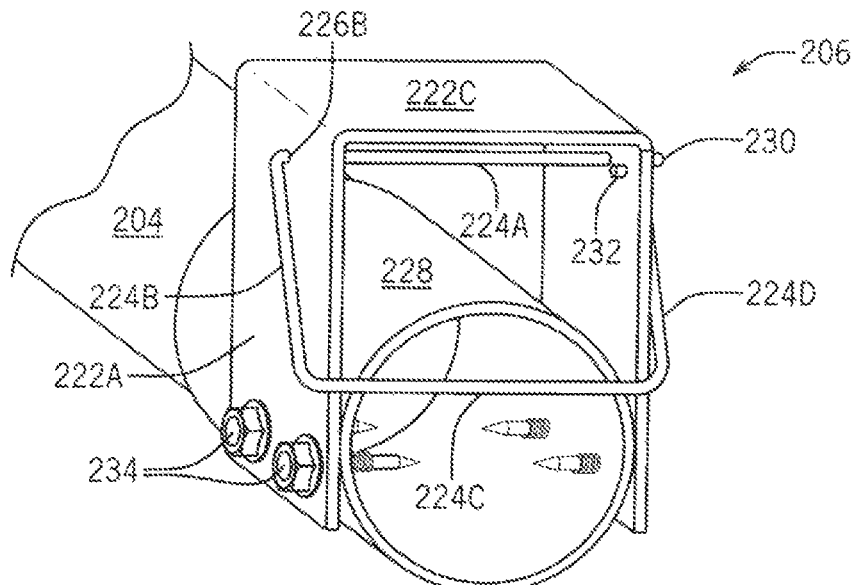
FIGS. 8 A, B and C show further details of the portion of FIGS. 7 A and B.
Figure 8B:
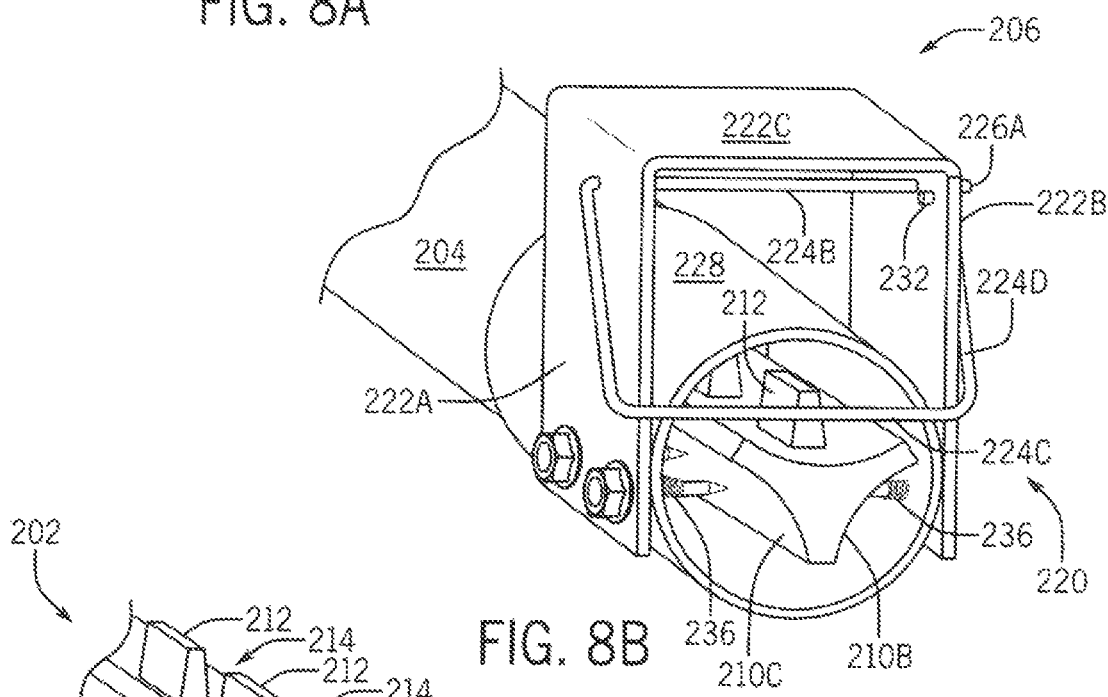

As is best shown in FIG. 8B, the vertical member 202 is an elongated post which has an axial core 208 from which ribs 209A, B and C extend to yield a T shaped cross-section. The ribs 209 form first, second and third faces or surfaces 210A,B and C, respectively. The faces 210 have a slight concave configuration. Studs or knobs 212 extend outwardly from the first face 210A forming notches 214 between them. Rib 209C extends rearwardly from the first face 210A and separates second and third faces 210B and C from each other. Each rib 209 extends radially from the center axis of the core 208. The studs 212 have truncated, triangular configuration. They are spaced uniformly approximately 2.0 inches from each other (on center) yielding a notch 214 length of 1.25 inches. In this arrangement, the distance between the outward extending face of the rib 216 to the outward extending face of the studs 212, or the effective maximum diameter "X" of the post 202, is 1.25 inches. The post 202 is rigid and preferably constructed of a metallic material. The post 202 preferably has a bottom end which is driven into earth, soil or the like. At least one post 202 is disposed at the end of each plant bed 203 and serves as an support anchor for the emitter line 201. Post 202 has a preferred length or height of approximately six feet, but may have a length from four to eight feet to permit adjustable movement of the emitter line 201 as the crop 203 below the emitter line 201 matures.

Referring also to FIGS. 7A, 7B, 8A and 8B, the sleeve 204 has a tubular configuration with a central lumen 216 having an inside diameter sufficient to slidingly surround the post 202, but still hold it closely to the post 202. A preferred inside diameter for the lumen 216 is $1^{15/16}$ inches for a post 202 having a maximum effective outside diameter "X" of $1^{1/4}$ inches. However, the inside diameter of the sleeve 204 may vary. The sleeve 204 has a preferred length of at least 24 inches, but it may be up to 36 inches. The ratchet positioner mechanism 206 facilitates a fast, easy to use, and secure means to raise and lower the height adjustment means 200. The ratchet mechanism 206 comprises a bracket 218 and a spring clamp or bale 220. The bracket 218 is formed of a rigid material such as galvanized steel. The spring bale 220 is formed of a metallic material, preferably steel. The bracket 218 has a generally rectilinear, U-Shaped configuration with three faces and an open end. Two opposing faces are fixedly coupled to the sleeve, near their outward ends, preferably by a pair of fasteners 224. The preferred dimensions of the bracket faces are $2^{3/8}$ inches (extending away from the sleeve) by $1^{1/2}$ inches (height) by $2^{3/8}$ inches (wide). This arrangement forms a solid base for mounting the spring clamp 220. The bracket 218 is preferably connected to a coupler collar 228, but it may be connected directly to the sleeve 204, for example at its bottom end. The coupler 228 is a cylindrical member which is connected to the sleeve 204 and has an outside diameter which is slightly greater than that of the sleeve 204. The spring clamp 220 comprises a first member 224a, a second member 224b, a third member 224c, and a fourth member 224d. These members are formed of a unitary piece of material, interconnected by 90 degree angle bends. The first member 224a has a first end 230 disposed in aperture 226A in face 222b. It extends across a space or gap (preferably $2^{1/4}$ inches) between faces 222b and 222a, through an aperture 226b therein. Spring member 224b is disposed outside of the bracket member 222A and bends to become spring member 224c (with a bale width of preferably $2^{5/8}$ inches) spanning the gap between the faces 222A and 222B, but entirely outside the space between those faces. Spring member 224b bends to become final spring member 224d which has a bend second end 232 that is embedded in aperture 226c.

Figure 7A:
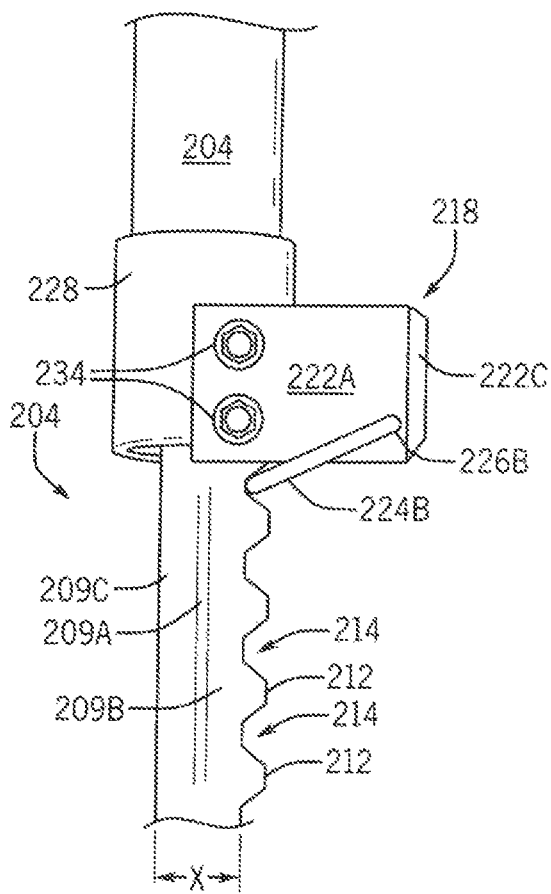
FIGS. 7 A and B show details of a portion of the line height adjuster.
Figure 7B:
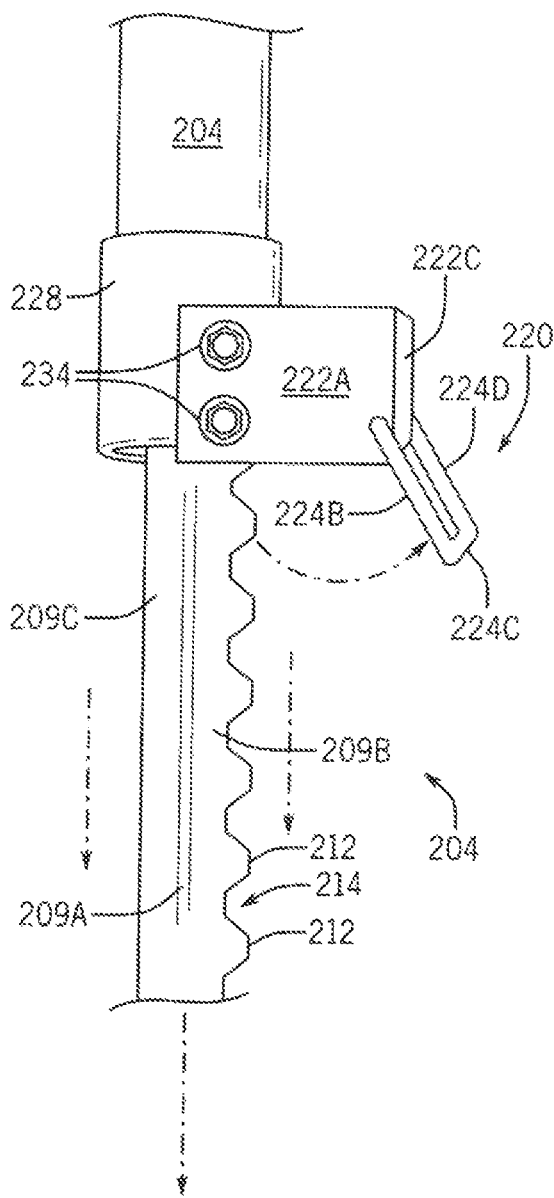
Figure 8C:
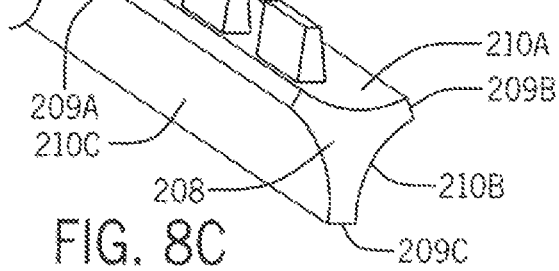

This assembly 200 yields an easy to use ratcheting device 206 that makes a distinctive "clicking" sound as the sleeve 204 slides up the studs/notches 212/214 of the post 202. The mechanism 206 yields a spring-loaded stop 220 that engages the studs 212 of the post 202. The mechanism 330 ratchets upwardly. It is releasable downwardly. As is best shown in FIGS. 7A and 7B, the sleeve 204 with a releasably engageable positioner 218/220 has an engaged mode (FIG. 7A) wherein the post 202 is engaged to maintain the sleeve's height and prevents downward sliding of the sleeve 204 and allows the sleeve 204 to freely ratchet upwardly on the post 202 incrementally. The releasably engageable positioner 218/220 can be disengaged (FIG. 7B) to an open, noneagaging position enabling free sleeve 204 sliding motion up and down the T-Post 202 and returned to a re-engagement. The sleeve 204 supports at least one end of one emitter line 201. As is best shown in FIGS. 8A and 8C, a pair of screws 234 secure faces 222a and 222b to the coupler 228. The screws 234 are aligned so that their inward ends 236 are oriented along post faces 210c and 210b. This yields a narrowed positioning interlude that prevents the sleeve 204 from rotating around the post 202, while at the same time, permitting the sleeve 204 to move freely vertically up and down the post 202. Returning to FIG. 7, the positioner 218/220 is moved up and down by first flipping open the spring 220 to a non-engaging position, second, manually grasping the sleeve 204 and moving it into a desired position relative to the post 202, and thirdly re-engaging the spring 220 with the post 202.

Returning also to FIGS. 2-4, the method of constructing the height adjustable fluid distribution and emission assemblies (and for using such assemblies) for each bed is discussed. Posts are securely anchored into the ground or on the floor at each end of the beds. The posts are constructed and arranged such that they will not bend, even when inward pressure is applied to the top of the post. An emitter line (or simply emitter) is extended the length of the row and attached to the corresponding post at the far end of the bed. The emitter is preferably constructed of PLATIX tubing. In one alternative embodiment, the wire element is a self-supporting gas pipe. The emitter line is connected on each end to an adjustable sliding sleeve that can slide up or down on the post. The sleeve has the ability to lock or maintain to a fixed elevated position, that is height on the post, and is easily repositioned upwards or downwards to a new position as needed. The emitter line is tensioned generally tautly using any number of commercially available tensions like a ratchet strap, inducing minimal deflection down the length of the row from the far end post which also has the same slider arrangement. Cross members or aerial ties can be used intermittently down the row to support deflection in the emitter run as desired, for example a 3-20 foot spacing to create a scallop effect down the length of the row, but generally supporting the emitters at an equally desirable height at or just above the top of the plants from one end of the bed to the other. Another benefit of the height adjustment assembly is that it can be constructed either on-site or pre-made and delivered to the site.

As shown for example in FIG. 6, emitters are positioned intimately proximate to the upper leafy canopy of the crop where sunlight is predominately incident. As the crop 48 continuously grows, the sliders at each end are moved up the posts incrementally as needed to accommodate plant growth and to stay above of the introduction of the latest applied mesh trellis in the bed as is commonly known and used in the cultivation of *Cannabis* or other such crops. Upward mobility of the device is permitted to correspond to plant growth. They may be removed or moved out of the way to facilitate harvest and other agronomic functions like the introduction of mesh.

The height adjustment assembly, including the releasably engageable positioner, sleeve, and post, can also be employed independently for other purposes like maintaining variable sign height, wind foils height (such as those disclosed in U.S. Pat. No. 10,165,73X) for Aerial Saplings, snow fences, ski area boundaries, farm fences, and the like.

FIGS. 9 A and B show an embodiment of a line suspension sub-system of the invention that provides for length adjustment and tensioning of the emitter lines, in addition to the height adjustment functionality discussed above. The system 300 comprises at least one height adjustment mechanism 302, a connection line 304 coupled to the mechanism 302, a bias member 306 connected to the line 304, a valve 308 connected to the spring 306 and an emitter line 310 fluidly communicatively connected to the valve 308. A fluid supply line 312 is fluidly communicatively connected to the valve 308. The emitter line 310 is disposed over at least one (if plural, the last or highest) mesh blanket 316 disposed over and in the subject plants 316.

FIGS. 10 A and B show an embodiment of an offset weighted foot and leg height adjustment system 400 of the invention that allows line 402 tensioning, without driving posts 404 into ground or a floor 406. This feature is beneficial for installation into greenhouse that have cement floors 406 or the like where posts 404 cannot be readily driven into the ground. The system 400 includes a foot 408 which serves as a base for the post 404. The feet 408 are have a base 410 having a holder 412 disposed proximate an end of the base 410 which is disposed proximate one end of the base 410. The majority of the base 410 is disposed away from that end and is deployed, in use, under tables 414 which hold crop 416. Again, height adjustment mechanisms 418 are part of the posts 404 and permit arrangement of the emitter lines 402 immediately above mesh panels 420.

Figure 11A:
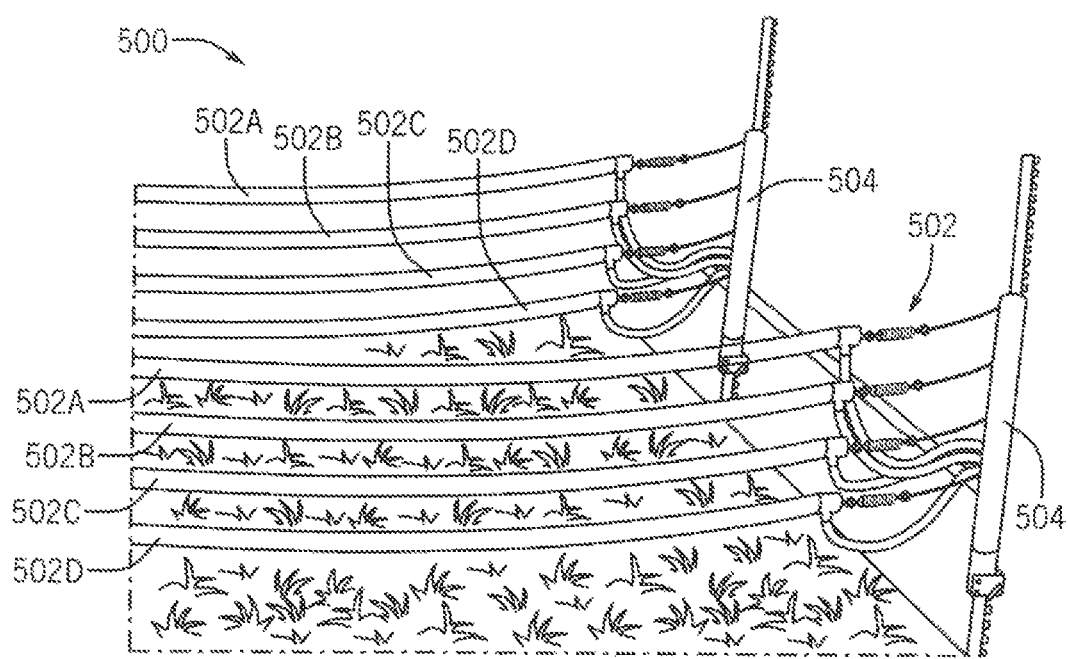

FIG. 11A shows a further embodiment of the gas emitter line and support system 500 of the invention for multiple introduction of a variety of gaseous media for micro-climate control inputs with a variety of flow rates and timing, and lines for vacuum intake of micro-climate including but not limited to odor reduction and humidity reduction. Multiple lines 502A-D are deployed by each height adjustment mechanism 504. The lines 502 function for humidity control 502A, odor control 502B, temperature control 503C, and CO2 enrichment 502D. The post and sleeve assembly can accommodate multiple lines of conductance for a variety of liquids, gases, aerosols, volumes and flow rates for a variety of micro-management objectives of the leafy canopy throughout a growth cycle. The additional lines of gaseous conductance can include thermally treated air, either heated in the colder late fall, winter and early spring months or cooled air during the summer drawn across an ambient vaporizer present, dried air to reduce humidity, micro-aerosol nutrients, flowering inducement, and reverse flow direction—intake—for odor control, humidity control and desirable micro-climate environmental practices. Curtains can be provided between the rows of the system, to isolate vectoring and maintain a variety of gaseous mixtures between adjacent rows. Referring to FIG. 11B, odor control line 502B is fluidically connected to controller 506, which is connected to vacuum 508, which is connected to filter 510, which is finally connected to gas output 512.

Figure 12:
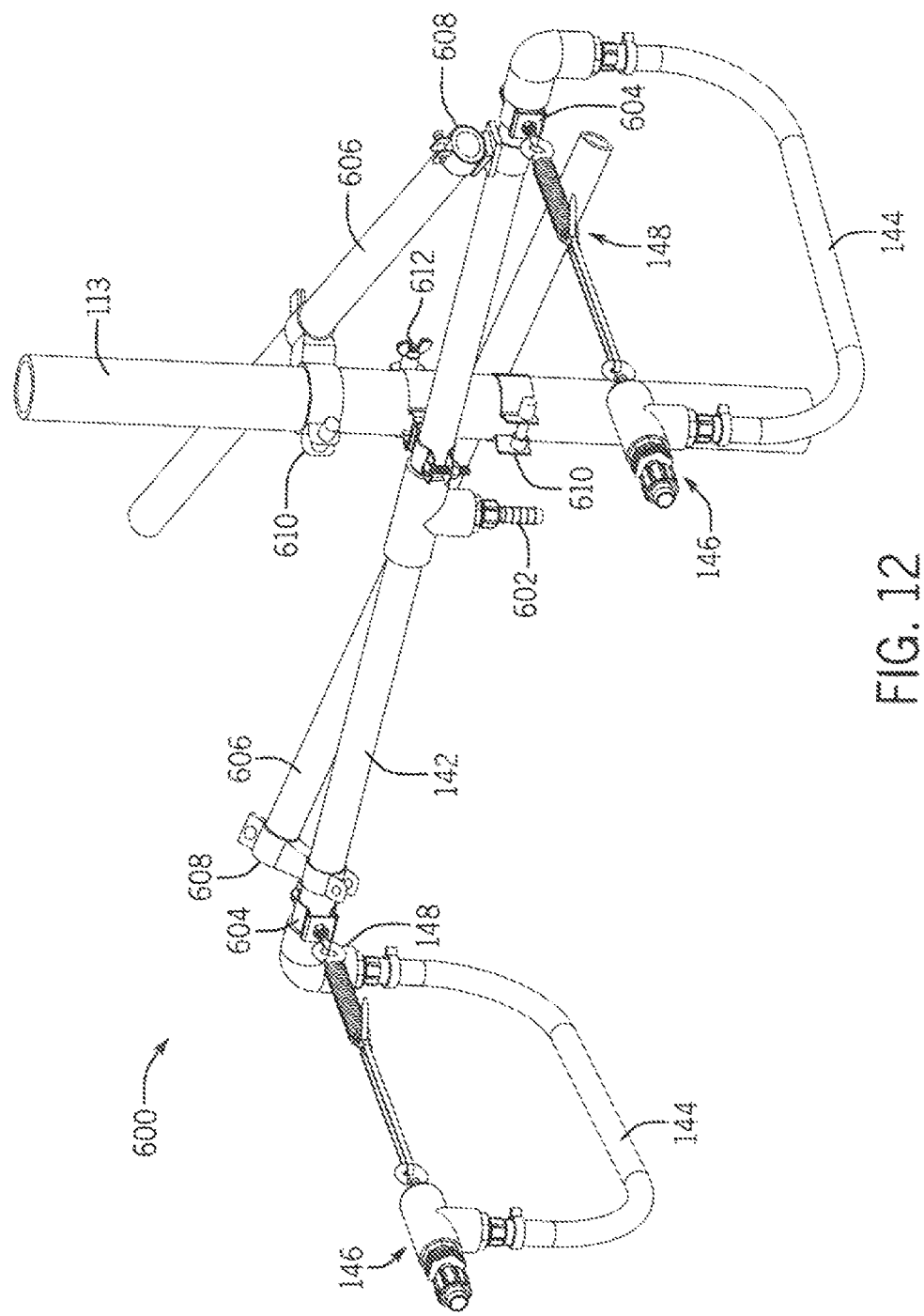
FIG. 12 shows an embodiment of a single post cross over manifold of the invention.
Figure 13A:
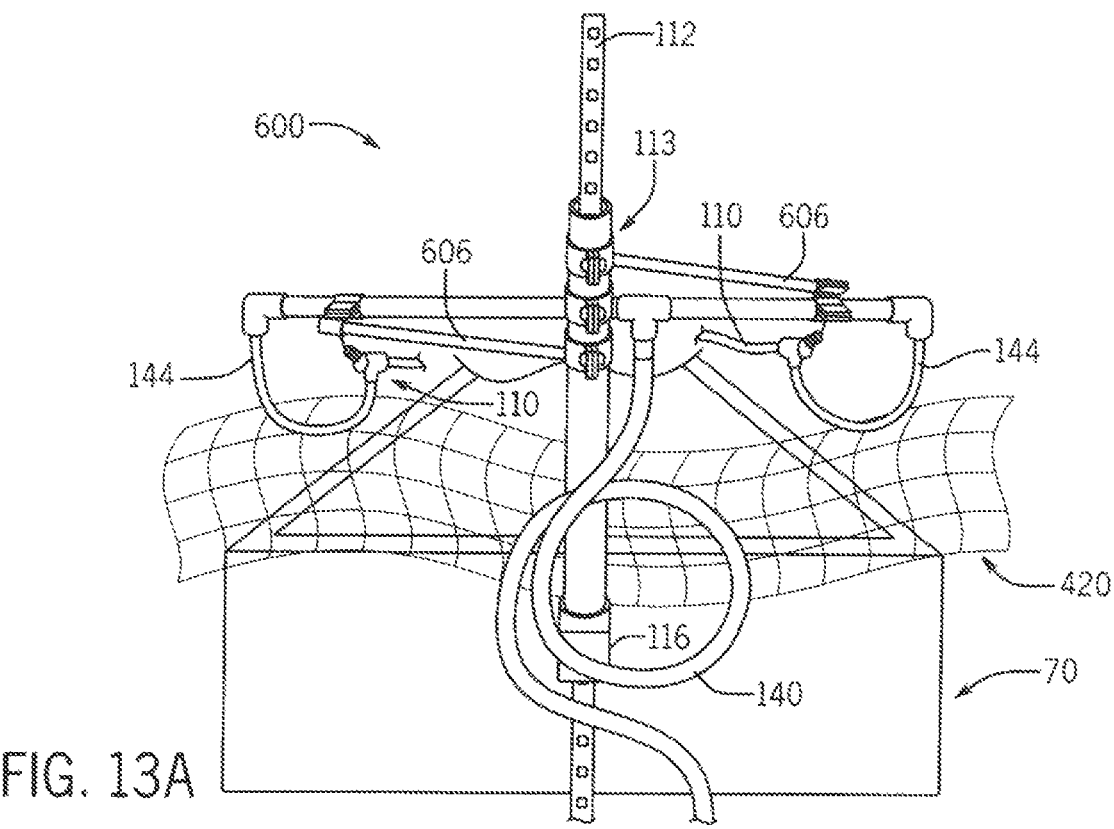
FIGS. 13 A-C further illustrate the single post cross over manifold.
Figure 13B:
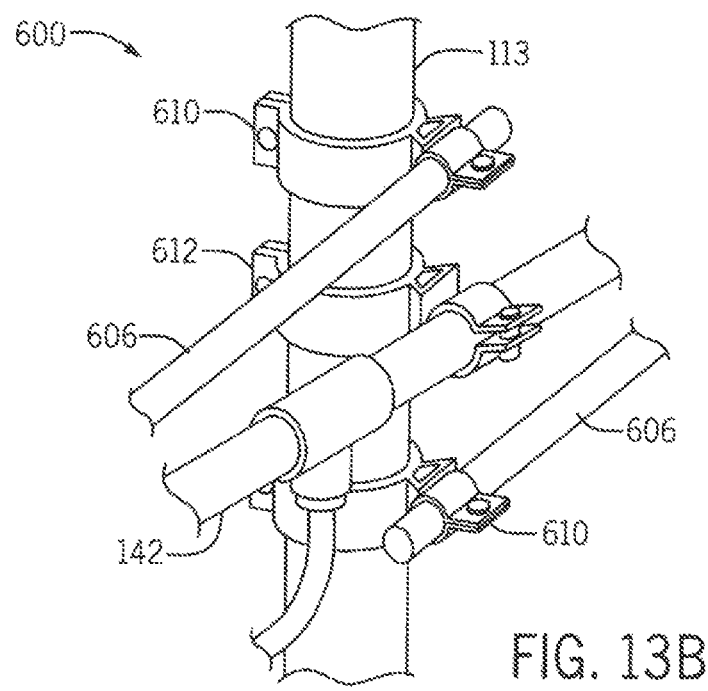
Figure 13C:
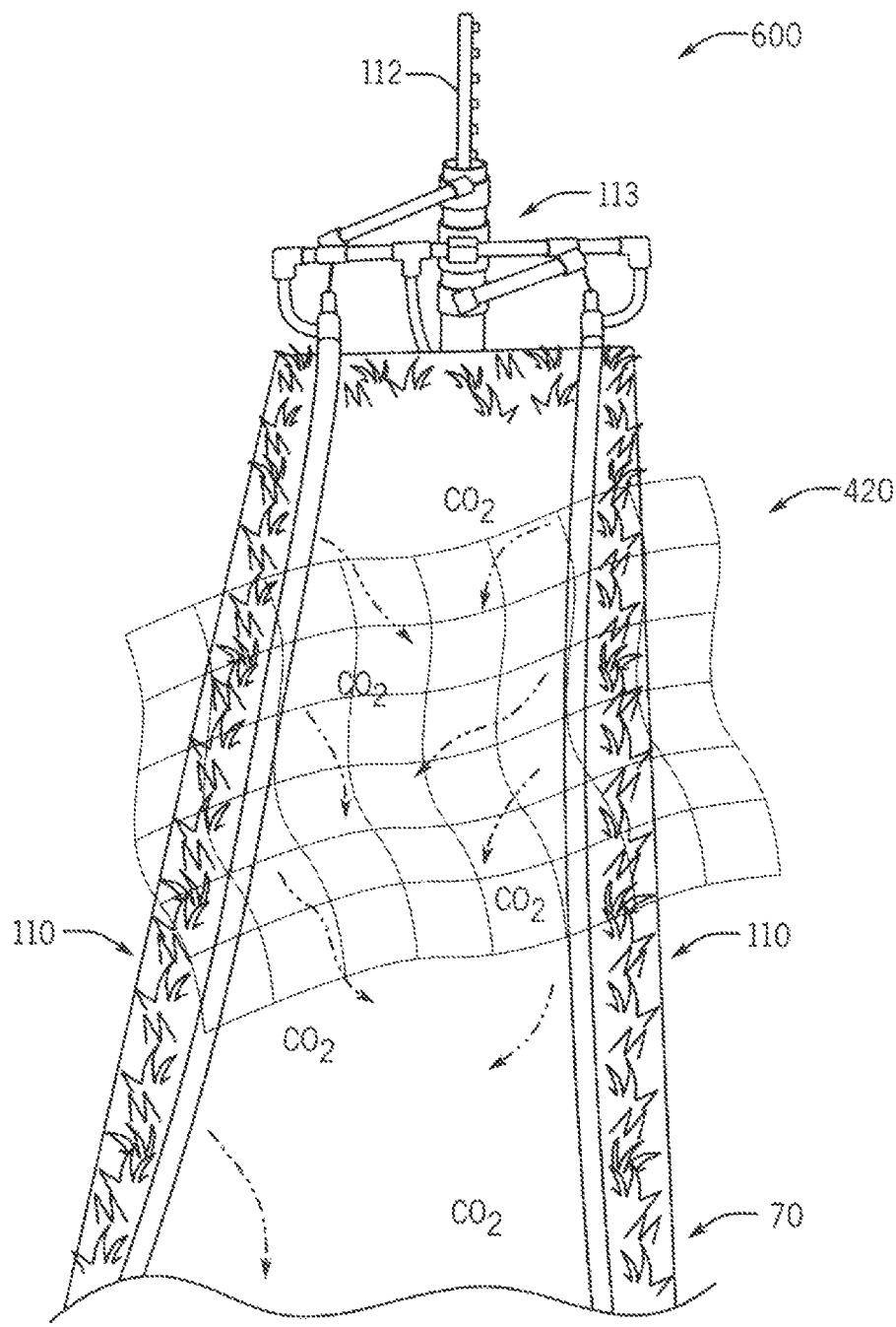

FIGS. 12 and 13A show an embodiment of a single post cross over manifold system 600 of the invention, that provide more than one attachment point to the vertical post. It further provides lateral supports that extend outwardly and are attached near the ends of the end support bars, thus relieving torsion across the end support bar exerted by the tensioning of the emitter lines. The advantage of this innovation is it requires only one post and sleeve assembly per bed-end, for a total of only two per bed. The single post cross over manifold 600 for controlling gas emission receives gas from a bed distribution manifold (not shown) or from a direct gas supply line at input connector 602. The gas distribution manifold 600 is disposed at the first or proximal end of the bed. Referring also again to FIGS. 2-4, for house 18 having plural beds 70, the manifold 130/600 for each bed 70 may receive gas from a hoop house distribution splitter or manifold 132 (connected to the main gas line 28A) vi a supply lines 134. Lines 134 are preferably buried under the soil. Emission lines 110 are elongated and extend essentially the entire length of each bed 70. Lines 110 A and B are disposed a predetermined distance apart, preferably 12 in., the lines also being equally spaced from the sides of the bed 70. The lines 110 are tubes having a central gas lumen and a plurality of emission apertures which emit CO2 gas to the plants 84. The lines 110 are preferably constructed of a flexible plastic material and have an outside diameter of ⅝ in. The apertures are preferably circular and have a diameter of between ¼ to ¾ in. The lines 110 are supported at each end by the single end post 112 via height adjustment sleeve 113. The line 110 ends are connected to the sleeve 113 via at least one tension adjustment assembly 148 at each line 110 end. The tensioners 148 are preferably spring bias type tensioners. The tensioners 148 are slidably connected to lateral gas transfer and support member 142 by slide couplers 604. These enable bed width adjustment. The lateral member 142 is also stabilized by support arms 606 via connectors 608 which are slidable the length of the arms 606 and are further rotatable about 2 axis. The support arms 606 are connected at their proximal ends via coupler 610 to sleeve 113. Lastly, the lateral arm 142 is coupled (rotatable about one axis) to the sleeve at it's midpoint via coupler 612.

In view of the length and flexibility of the emission lines 110, at least one lateral mid support assembly may be disposed along the length of the lines 110, typically at the mid or half way point of the length of the lines 110. The lateral support preferably extends below and supports both lines 110A-B for ease of adjustment. A CO2 gas line pressure sensor is preferably connected in line with the assembly 130, preferably at the downstream end. This embodiment of the assembly 600 utilizes a continuous loop lumen from end to end. Alternatively, the gas lines 110 A/B may terminate at the distal end whereby all gas is emitted from the line apertures and does not circulate.

Importantly, the gas emission assemblies 600 are height adjustable so that the lines may be disposed close the plants as they grow. The lines 110 are preferably oriented just above the tops of the plants. In the preferred embodiment the height adjustment means is the adjustable sleeve 113 with ratchet mechanism 115. This permit adjustment of the entire gas line assembly either flat (as shown) or tilted, during height adjustment. This is beneficial when plants grow disproportionally in the beds 70.

Figure 14:
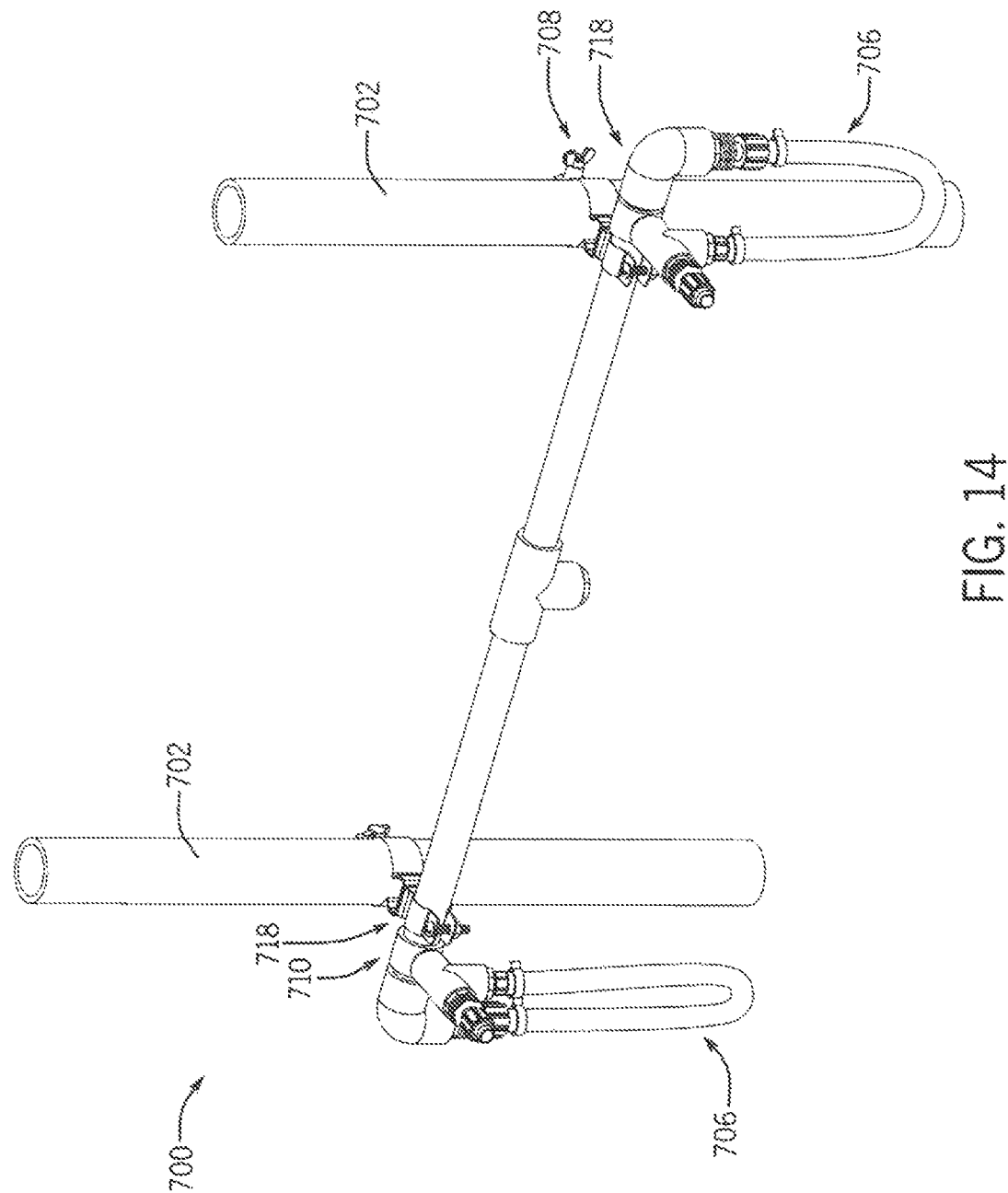
FIG. 14 shows an embodiment of a dual post cross over manifold, which is adjustable.

FIG. 14 shows another embodiment of an adjustable, universal, distal end manifold 700, which is adjustable when the width of the bed is X, the width of the elongated emitter lines is set at ¼x from either side of the bed, with line width not to exceed 3' between inner bed spacing. This manifold 700 is disposed at the distal end of each bed 70 (the end opposite the gas supply manifold 600). The distal end manifold 700 includes a pair of height adjustment sleeves 702, a lateral support and gas supply member 704, and flexible, adjustable gas connectors 706 which are connected to emitter lines 110. The support and supply member 704 is coupled to the height adjustment sleeves 702 by couplers 708. The flexible gas connectors 706 are adjustable, for bed 70 width, by slide couplers 710.

FIGS. 15 A and B illustrate an embodiment of a gas control system 800 of the invention that adjusts gas application relative to wind direction and magnitude. The allocation of gas goes towards the upwind line. The system 800 includes a pair of emitter lines 802 A and B coupled to height adjustable line support and gas supply ends 804A and B.

The system of the invention can be extended to the control of pests such as mites. For any of the following a technician is present desirably a skilled and trained person that is a Pest Management Agent. The infested plants can be tented with a sealed plastic fabric cover. All people and mammals are directed to exit the enclosures and it is double checked to make sure it is "All Clear!" Then the CO2 gas is introduced for a period to organically kill most all of the pests on the plants without damaging the plants themselves. It is anticipated that there is wide variation between plants and pests as to toxic levels of gas exposure and the exposure level and duration is specific to the non-phytotoxicity to the host plant species and its maturity, and the lethal level of toxicity for the targeted pest species and its life cycle including eggs.

It is anticipated that a variety of mixtures of gas can be used to accomplish the desired outcome of non-toxic affect to the host plants and lethal affect to the pest and eggs. The level of gas(s) and duration of application is determined by two variables, determining the non-phytotoxicity to the host plants/targeted crop, and determining the lethal level and duration required to kill the targeted pest and desirably their eggs.

Multiple plants in that garden can be tented at once and a whole group can be cleansed of pest at once either through a single tent or multiple tents. For *Cannabis*, certain enclosures can have the gas shutoff to concentrate the flow of gas in one or more enclosures for 90 minutes, allowing the gas flow through the system without the system freezing-up through the formation of dry ice or the likes, thus restricting the necessary flow to achieve and maintain pest lethal levels in the targeted enclosures. If necessary additional valves can be opened in the target enclosures to achieve more rapid gaseous flow rates to attain the lethal levels desired. At the end of the duration, the room is enclosure ventilated either with fans or doors and sidewalls are reopened, the elevated gas is allowed to escape and returned to normal—safe ambient levels, and workers can safely return into the space. This process can be repeated after several days to target any eggs that hatch and reduce any resurgence of pests.

In a preferred embodiment a single pest control enclosure is established at the farm for passing new plants/clones through a cleansing process, that are coming into the farm. The clones are given a $CO_2$ bath or other gaseous media to reduce the pest count and eggs of pest present on the new plants coming from a remote source.

It is envisioned by the invention that the liquefied gas tank, vaporizer, electronic controllers, sensor, clock and delivery pipes can be in a fully mobilized and contained unit. The unit can travel from farm to farm and provide gaseous pest control, on an as needed basis, following the same protocol as described above.

Figure 17:
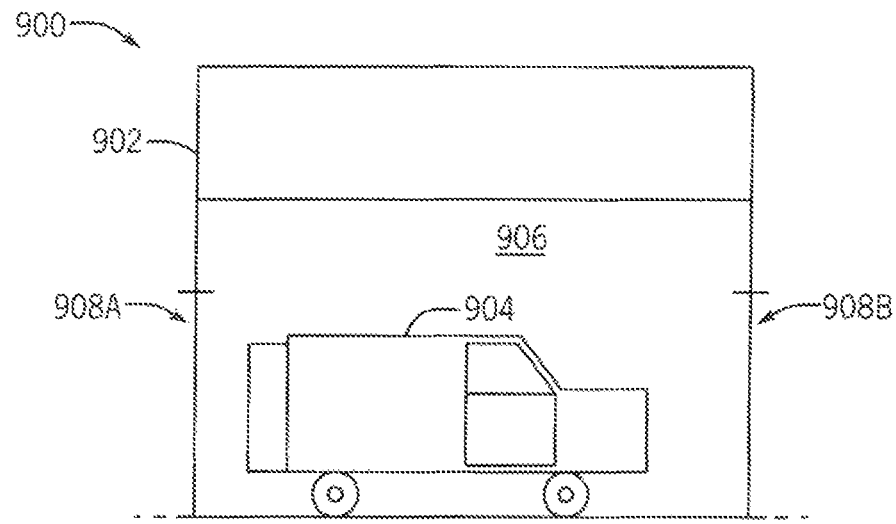
FIG. 17 is a side elevation view of the fixed base pest control system.
Figure 18:
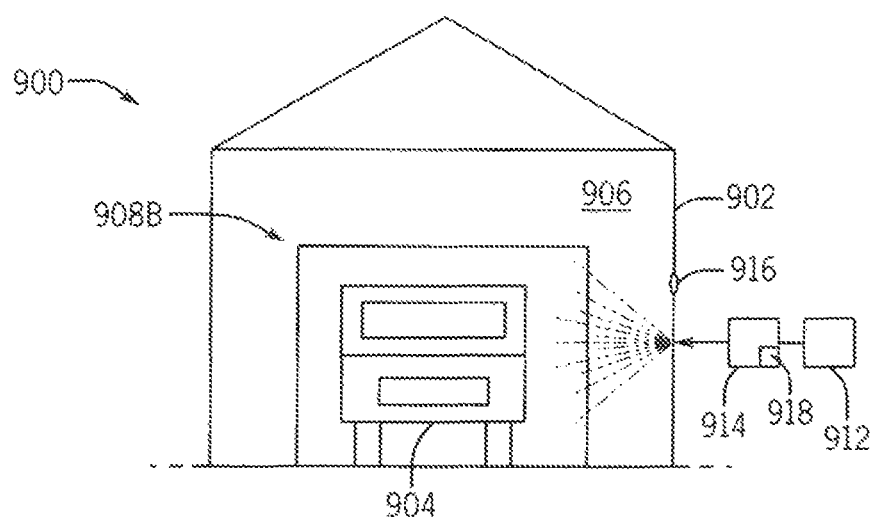
FIG. 18 is an end elevation view of system of the pest control system, from the exit end thereof.

FIGS. 16-18 show a third embodiment of a pest control system, namely a fixed base pest control system 900. It comprises a building 902 which is disposed along a transportation corridor (for example a highway, road, street or the like) for routine shipments of clones/saplings/cultivars or the like (baby plants for transplanting) being transported from a remote production nursery, into a production region. The building 902 is preferably designed similar to a carwash, in that a truck 904, van, or lorry can drive in and out of one or more enclosures 906 of the building 902. Once the vehicle 904 transporting the clones is within the enclosure, both building ingress and egress doors 908 A and B are tightly sealed. The vehicle's 904 cargo bay doors 910 are fully opened up, so that the gas from supply 912 provided through input mechanism 914 has free and unencumbered access to all of the clones. All people and animals exit the enclosure 906. The gas is then elevated within the enclosure to a lethal level as determined by sensor 916 for pests for the necessary duration as determined by clock 918. At the end of the duration, the enclosure doors 908 are reopened, the elevated gas is allowed to escape and returned to normal—safe ambient levels. The truck driver can re-enter the area to reseal his vehicle 904 cargo bay doors 910, can get back in the vehicle 904 and drive away to his destination farm for delivery of the now pest cleansed baby transplants. The building 902 is immediately ready to receive a next vehicle for processing.

A final version is to set up the clone cleansing enclosure and facility right at the production center of the clones and pass the clones through the pest control process just before they are loaded into the trucks for shipment to remote farms.

Any of the above embodiments the procedure can be done in the dark when the plants are not undergoing photosynthesis.

FIG. 19 is a diagram of an embodiment of a humidity control system 1000 for hoop houses of the present invention. The system 1000 includes an air intake 1002, an air filter 1004 fluidly connected to the input 1002, a compressor 1006 connected to an output of the filter 1004, a UV sterilizer 1008 connected to the output of the compressor 1006, and a cut in valve 1010 connected to the output of the sterilizer and to a CO2 gas input line 1012. The valve 1010 is electrically connected to a clock 1014 which switches on dry air supply from the upstream components of the system 1000 at a predetermined time at or near sundown, and then switches to CO2 supply from the line 1012 at a predetermined time at or near dawn. The output 1016 of the valve 1010 is connected to a hoop house or the like. Humidity in greenhouses and hoop houses is a significant problem principally at night. Build up of high humidity levels in greenhouses and hoop houses routinely goes straight to 100% humidity at night, when the ventilation doors and windows are closed. This is due to the plants continued respiration of large amounts of water vapor. This nighttime buildup of humidity and moisture condensation, is directly responsible for resulting mold formation on the flower, which is an economic management problem for both *Cannabis* growers and other crops grown in greenhouses. The presence of mold can render the harvest completely valueless.

Therefore, it is envisioned that the current invention can be used at night, when it is not delivering the daytime $CO_2$ enrichment, to pump in pre-treated, dry air. A "cut-in" valve (allowing deactivated $CO_2$ supply to be isolated), air compressor and a dehumidifier are provided, providing for the input of ambient air that is dehumidified. This is a very efficient method as all existing field plumbing can be used to input the dry air.

Desirably a very efficient air filter like a carbon filter is installed at the intake to remove unwanted airborne particulate and contaminants. These contaminants are removed as they can clog the emitters in the gas delivery system and can be damaging to the plants. Also, desirably the input air is passed through UV fungal spore killing lights to prevent the spread of undesirable pestilence within the grow space. Also, the input air can have a thermal component added if desired.

Odor from the production of *Cannabis* particularly grown in older greenhouses, hoop house and outdoor production is a known public nuisance that is unresolved. Very stinky *Cannabis* is most notorious as over night when build up occurs. The mitigation of odor from these sources is desirable. So the off-take of very humid air is also very stinky nuisance air, can take place on a hydraulically balanced line that sucks up (reverse arduous path emitter) located generally 1-3 feet distant to the input line with flow balanced to the desirable matching flow rates if necessary for pressure management desired in the structure.

The sucking up and management of odor and humidity off-take can happen in conjunction with the dry air input. It is even envisioned that the two-line $CO_2$ system input described in the current embodiment, could be used in this described methodology at night to achieve both humidity control and odor mitigation. Desirably to conserve energy the two air flows can pass across each other through an air-to-air heat exchanger to conserve energy.

Further, a pass-through enclosure with gaseous enrichment from the system can even be provided to suppress vector transmission as people, equipment and supplies enter and leave the production area.

Applicants also hereby incorporate by reference the disclosures of and can be used in conjunction with the following US patent applications and Registrations:

Title: INTEGRATED, SELF SUPPORTING ELEVATED GAS DELIVERY TUBE AND LED LIGHT FOR CROP FOLIAGE Application No.: 62/367,276
Filing Date: Jul. 27, 2016
Title: GROUND TO CANOPY GASEOUS MEDIA DELIVERY SYSTEM FOR CROPS INCLUDING LEAK DETECTION AND HOOK AND WAND FEATURES
Application No.: 62/403,800
Filing Date: Oct. 4, 2016
Title: MULTI-MEDIA IRRIGATION TECHNOLOGY
Application No.: 62/331,592
Filing Date: May 4, 2016
Title: AERIAL FLUID APPLICATION TECHNOLOGY FOR ORCHARDS, VINEYARDS AND THE LIKE
U.S. Pat. No. 10,165,732
Issue Date: Jan. 1, 2019
Title: AERIAL FLUID APPLICATION TECHNOLOGY FOR ORCHARDS, VINEYARDS AND THE LIKE
Application Ser. No. 16/196,605
Filing Date: Nov. 20, 2018

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A height adjustment apparatus for a fluid sprayer, comprising a post adapted to be disposed vertically relative to a ground surface, a sleeve disposed around the post and slidable along the post, and a positioner connected to the sleeve which selectively engages and disengages the post to hold the sleeve in a fixed position along the post or to permit sliding of the sleeve along the post, respectively, and means to connect a sprayer to the sleeve; wherein the positioner comprises a generally U shaped bracket and a spring clamp attached to the bracket such that the spring clamp is movable between a post engagement mode and a post disengagement mode; the height adjustment apparatus further comprising at least two studs extending into a central lumen of the sleeve towards each other, the at least two studs, during use, contacting the post and preventing the sleeve from rotating with respect to the post, and wherein the studs engage two faces of the post which do not have studs.

2. The height adjustment apparatus of claim 1, wherein the post is a studded T-type post having generally T shaped cross-section with uniformly spaced studs on one longitudinal face thereof, spaces between studs forming notches.

3. The height adjustment apparatus of claim 1, wherein the sleeve has a predetermined length and a predetermined inside diameter which is greater than an outside crossectional dimension of the post.

4. The height adjustment apparatus of claim 1, wherein the bracket has first, second and third rectilinear faces, and a space disposed between the first and third faces, a predetermined part of the sleeve being disposed within the space.

5. The height adjustment apparatus of claim 4, wherein the spring claim has first, second, third, and fourth rectilinear segments, the first segment extending from a mounting on the bracket first face across the bracket space and through the bracket third space, the second segment extending outside the bracket, generally along the third bracket face, the third segment extending outside the bracket generally between the third bracket face and the first bracket face, and the fourth segment extending outside the bracket, generally along the first bracket face to a mounting on the bracket first face.

6. The height adjustment apparatus of claim 1, wherein the U shaped bracket is disposed at a bottom end of the sleeve.

7. The height adjustment apparatus of claim 6, further comprising a coupler member attached to the sleeve, and wherein the positioner is connected to the coupler member.

8. The height adjustment apparatus of claim 1, wherein there are two sets of two studs, each set of studs being oriented in tandem with respect to each other.

9. The height adjustment apparatus of claim 1, wherein the studs are screws which couple the bracket to the sleeve.

10. The height adjustment apparatus of claim 1, wherein the means to connect a sprayer to the sleeve is selected from the group consisting of a screw, a bolt, an eyelet, adhesive, and a weld.

11. A height adjustment apparatus for a fluid sprayer, comprising
   a post adapted to be disposed vertically relative to a ground surface, wherein the post is a studded T-type post having generally T shaped cross-section with uniformly spaced studs on one longitudinal face thereof, spaces between studs forming notches;
   a sleeve disposed around the post and slidable along the post, wherein the sleeve has a predetermined length and a predetermined inside diameter which is greater than an outside crossectional dimension of the post;
   a positioner connected to the sleeve which selectively engages and disengages the post to hold the sleeve in a fixed position along the post or to permit sliding of the sleeve along the post, respectively, and wherein the positioner comprises a generally U shaped bracket and a spring clamp attached to the bracket such that the spring clamp is movable between a post engagement mode and a post disengagement mode, and
   means to connect a sprayer to the sleeve.

12. A height adjustment apparatus for an elongated agricultural gas emission line, comprising
   a. a post adapted to be disposed vertically relative to a ground surface, wherein the post is a studded T-type post having generally T shaped cross-section with uniformly spaced studs on one longitudinal face thereof, spaces between studs forming notches;
   b. a sleeve disposed around the post and slidable along the post, wherein the sleeve has a predetermined length and a predetermined inside diameter which is greater than an outside crossectional dimension of the post;
   c. a positioner connected to the sleeve which selectively engages and disengages the post to hold the sleeve in a fixed position along the post or to permit sliding of the sleeve along the post, respectively, and wherein the positioner comprises a generally U shaped bracket and a spring clamp attached to the bracket such that the spring clamp is movable between a post engagement mode and a post disengagement mode,
  i. the bracket having first, second and third rectilinear faces, and a space disposed between the first and third faces, a predetermined part of the sleeve being disposed within the space,
  ii. the spring claim having first, second, third, and fourth rectilinear segments, the first segment extending from a mounting on the bracket first face across the bracket space and through the bracket third space, the second segment extending outside the bracket, generally along the third bracket face, the third segment extending outside the bracket generally between the third bracket face and the first bracket face, and the fourth segment extending outside the bracket, generally along the first bracket face to a mounting on the bracket first face; and
d. means to connect the gas emitter line to the sleeve, the means to connect a sprayer to the sleeve being selected from the group consisting of a screw, a bolt, an eyelet, adhesive, and a weld.

\* \* \* \* \*